US009661349B2

United States Patent
Caron et al.

(10) Patent No.: US 9,661,349 B2
(45) Date of Patent: May 23, 2017

(54) METHOD AND SYSTEM FOR VIDEO ERROR CORRECTION

(71) Applicant: SOCOVAR, LIMITED PARTNERSHIP, Montreal (CA)

(72) Inventors: François Caron, Montreal (CA); Stéphane Coulombe, Brossard (CA)

(73) Assignee: Socovar, Limited Partnership, Montreal (CA)

( * ) Notice: Subject to any disclaimer, the term of this patent is extended or adjusted under 35 U.S.C. 154(b) by 374 days.

(21) Appl. No.: 14/539,454

(22) Filed: Nov. 12, 2014

(65) Prior Publication Data

US 2016/0094861 A1   Mar. 31, 2016

Related U.S. Application Data

(63) Continuation of application No. PCT/CA2013/050370, filed on May 14, 2013.

(Continued)

(51) Int. Cl.
*H04N 7/12* (2006.01)
*H04N 19/66* (2014.01)
(Continued)

(52) U.S. Cl.
CPC .............. *H04N 19/66* (2014.11); *H04L 1/007* (2013.01); *H04L 1/0054* (2013.01);
(Continued)

(58) Field of Classification Search
CPC ...... H04N 19/66; H04N 19/521; H04N 19/70; H04N 19/895; H04N 19/184; H04N 19/65;
(Continued)

(56) References Cited

U.S. PATENT DOCUMENTS 8,151,305 B2    4/2012  Doerr et al.
8,156,400 B1    4/2012  Yeo et al.
(Continued)

FOREIGN PATENT DOCUMENTS

CA    2013158 C    11/1990
CA    2394263 A1   6/2001

OTHER PUBLICATIONS

Cartile, T.; International Search Report from corresponding PCT Application No. PCT/CA2013/050370; search completed Aug. 5, 2013.

(Continued)

*Primary Examiner* — Allen Wong
(74) *Attorney, Agent, or Firm* — Blake, Cassels & Graydon LLP; Brett J. Slaney

(57) ABSTRACT

In real-time video applications, where unreliable networks are commonplace, corrupted video packets can affect adversely the visual quality. In this patent application, we present an improved method and system for video error correction based on maximum likelihood. Rather than discarding corrupted video packets, the method estimates the likeliest syntactically valid video slice content based on these packets. We present two embodiments, which permits solving the problem at the slice-level, and a simplified solution operating at the syntax element-level. The performance of the method is evaluated using the H.264 baseline profile. Unlike existing video error concealment methods, we correct errors in the bitstream instead of reconstructing missing pixels. Simulation results show that the proposed method yields improved visual quality, and is also computationally simpler than existing state-of-the-art error concealment methods. A corresponding system for video error correction is also provided.

30 Claims, 11 Drawing Sheets

Related U.S. Application Data

(60) Provisional application No. 61/754,724, filed on Jan. 21, 2013, provisional application No. 61/646,852, filed on May 14, 2012.

(51) Int. Cl.

| | | |
|---|---|---|
| *H04N 21/438* | (2011.01) | |
| *H04N 21/63* | (2011.01) | |
| *H04N 21/647* | (2011.01) | |
| *H04L 1/00* | (2006.01) | |
| *H04N 19/70* | (2014.01) | |
| *H04N 19/184* | (2014.01) | |
| *H04N 19/895* | (2014.01) | |
| *H04N 19/513* | (2014.01) | |
| H04N 19/65 | (2014.01) | |

(52) U.S. Cl.
CPC ......... *H04N 19/184* (2014.11); *H04N 19/521* (2014.11); *H04N 19/70* (2014.11); *H04N 19/895* (2014.11); *H04N 21/4382* (2013.01); *H04N 21/631* (2013.01); *H04N 21/6473* (2013.01); *H04N 19/65* (2014.11)

(58) Field of Classification Search
CPC ............. H04N 21/4382; H04N 21/631; H04N 21/6473; H04L 1/0054; H04L 1/007
USPC .................................................... 375/240.16
See application file for complete search history.

(56) References Cited

U.S. PATENT DOCUMENTS

| | | | |
|---|---|---|---|
| 2009/0249165 A1 | 10/2009 | Gracie et al. | |
| 2010/0275092 A1* | 10/2010 | Ogiso ................. | H04L 25/4917 714/752 |
| 2011/0239299 A1* | 9/2011 | Chen ................... | H04L 63/1408 726/23 |
| 2012/0206440 A1* | 8/2012 | Tian ................... | H04N 13/0275 345/419 |

OTHER PUBLICATIONS

Weidman, C. et al.; "Combined Sequential Decoding and Error Concealment of H.264 Video"; IEEE 6th Workshop on Multimedia Signal Processing; Sep. 2004; pp. 299-302.

Levine, D. et al.; "Iterative Joint Source-Channel Decoding of H.264 Compressed Video"; IEEE International Symposium on Circuits and Systems; May 2007; pp. 517-1520.

Sabeva, G. et al.; "Robust Decoding of H.264 Encoded Video Transmitted over Wireless Channels"; IEEE 8th Workshop on Multimedia Signal Processing; Oct. 2006; pp. 9-13.

Sun, H. et al.; "Concealment of Damaged Block Transform Coded Images Using Projections onto Convex Sets"; IEEE Transactions on Image Processing; Apr. 1995; pp. 470-477; vol. 4, No. 4.

Larzon, L.A. et al.; "UDP Lite for Real Time Multimedia Applications"; IEEE International Conference on Communications; Jun. 1999.

Trudeau, L. et al.; "Pixel Domain Referenceless Visual Degradation Detection and Error Concealment for Mobile Video"; 18th IEEE International Conference on Image Processing; Sep. 2011; pp. 2229-2232.

Nguyen, N.Q. et al.; "Iterative Joint Source-Channel Decoding for H.264 Video Transmission using Virtual Checking Method at Source Decoder"; 23rd Canadian Conference on Electrical and Computer Engineering; May 2010; pp. 1-4.

Farrugia, R. et al.; "Robust decoder-based error control strategy for recovery of H.264/AVC video content"; IET Communications; Sep. 2011; pp. 1928-1938; vol. 5, No. 13.

Wenger, S.; "H.264/AVC Over IP"; IEEE Transactions on Circuits and Systems for Video Technology; Jul. 2003; pp. 645-656; vol. 13, No. 7.

Wiegand, T. et al.; "Overview of the H.264/AVC Video Coding Standard"; IEEE Transactions on Circuits and Systems for Video Technology; Jul. 2003; pp. 560-576; vol. 13, No. 7.

Kwok, W. et al.; "Multi-Directional Interpolation for Spatial Error Concealment"; IEEE Transactions on Consumer Electronics; Jun. 1993; pp. 455-460; vol. 39, No. 3.

Lee, W.-T. et al.; "Joint Source-Channel Decoder for H.264 Coded Video Employing Fuzzy Adaptive Method"; IEEE International Conference on Multimedia and Expo; Jul. 2007; pp. 755-758.

Qian, X. et al.; "Recovering Connected Error Region Based on Adaptive Error Concealment Order Determination"; IEEE Transactions on Multimedia; Jun. 2009; pp. 683-695; vol. 11, No. 4.

Wang, Y. et al.; "Joint Source-Channel Decoding for H.264 Coded Video Stream"; IEEE Transactions on Consumer Electronics; Nov. 2005; pp. 1273-1276; vol. 51, No. 4.

\* cited by examiner

METHOD AND SYSTEM FOR VIDEO ERROR CORRECTION

CROSS-REFERENCE TO RELATED APPLICATIONS

The present application is a continuation of International PCT Application No. PCT/CA2013/050370 filed on May 14, 2013, which claims priority from U.S. Provisional Application No. 61/754,724 filed on Jan. 21, 2013 and also claims priority from U.S. Provisional Application No. 61/646,852 filed on May 14, 2012, all incorporated herein by reference.

FIELD OF THE INVENTION

The present invention relates to video communications and more particularly to a system and method for providing error correction and/or concealment of errors in video packets caused during transmission.

BACKGROUND OF THE INVENTION

The problem of error control and concealment in video communication becomes increasingly important because of the growing interest in video delivery over unreliable channels such as wireless networks and the Internet. Real-time video transmission is a challenging task, especially when typical error handling mechanisms such as retransmission cannot be used.

The H.264 standard [as discussed in: "Advanced Video Coding for Generic Audiovisual Services," ISO/IEC 14496-10 and ITU-T Recommendation H.264, November 2007], with its network friendly approach, has introduced new coding tools to deal with the challenging task of sending video from one device to another. Flexible Macroblock Ordering (FMO) [as discussed in: S. Wenger. "H.264/AVC over IP," IEEE Transactions on Circuits and Systems for Video Technology, vol. 13, no 7, p. 645-656, July 2003] was introduced to break the traditional raster scan ordering allowing packets to hold non-consecutive macroblocks (MBs). As a result, packet loss has a less impact, and error concealment mechanisms offer more information (boundaries) to produce better visual results.

Arbitrary Slice Ordering (ASO) [T. Wiegand, G. J. Sullivan, G. Bjontegaard and A. Luthra. "Overview of the H.264/AVC video coding standard," IEEE Transactions on Circuits and Systems for Video Technology, vol. 13, no. 7, p. 560-576, July 2003] was introduced to break up the relationship between packets, making every slice/packet independently decodable. ASO also enhances the robustness of the data to packet loss. Data partitioning [as discussed in: S. Wenger. "H.264/AVC over IP," IEEE Transactions on Circuits and Systems for Video Technology, vol. 13, no 7, p. 645-656, July 2003], which is available with the Extended Profile, took things one step further by splitting the prediction information (MB types, motion vectors, etc.) from the residual information (luminance and chrominance values), based on the argument that the prediction information was more important than the residual information. Researchers have verified this assumption by applying Unequal Error Protection (UEP) schemes where data partitions A, partitions carrying all syntax element belonging to Category 2, were better protected. Intra placement, although not a new feature, was enhanced to allow Intra MBs to use information from neighboring Inter MBs.

These tools all share the same two goals: 1) to enhance robustness to data loss and 2) to assist error concealment/resynchronization. They also share the same drawback as the added robustness comes at the cost of reduced compression efficiency, resulting in lower visual quality compared to a non error resilient scheme when there is no error. A careful compromise between error robustness and coding efficiency, as well as an adequate choice of FEC, is a difficult problem, mainly because channel conditions in wireless environments vary over time.

Error concealment, on the other hand, does not require additional bandwidth, i.e. doesn't sacrifice bandwidth for error protection. Using correctly received information as well as information regarding a previous picture, it estimates the value of the missing pixels to reconstruct pictures when errors occur. However, its performance is greatly reduced when lost regions have low spatiotemporal correlation with neighboring regions that have been correctly decoded.

Starting with Sun [H. Sun and W. Kwok. "Concealment on Damaged Block Transform Coded Images Using Projections onto Convex Sets," IEEE Transactions on Image Processing, vol. 4, no 4, p. 470-477, April 1995] and Kwok's [W. Kwok and H. Sun. "Multi-directional interpolation for spatial error concealment," IEEE Transactions on Consumer Electronics, vol. 39, no 3, p. 455-460, June 1993] initial work, researchers have published spatial, temporal and hybrid approaches to interpolate lost pixels. The common denominator throughout error concealment literature is that transmission errors only arise in the form of packet loss where corrupted packets are always discarded. However, video data falls into the class of applications that benefit from having damaged data delivered rather than discarded [as discussed in L. A. Larzon, M. Degemark and S. Pink. "UDP lite for real time multimedia," IEEE International Conference on Communications, June 1999]. Wenger conveniently illustrates the use of forbidden_zero_bit in a scenario where a smart node forwards a corrupted Network Abstraction Layer Unit (NALU) to its destination [as discussed in: S. Wenger. "H.264/AVC over IP," IEEE Transactions on Circuits and Systems for Video Technology, vol. 13, no 7, p. 645-656, July 2003]. Assuming that corrupted packets do reach the decoder, Weidmann [as discussed in: C. Weidman, P. Kadlec, O. Nemethova and A. Al Moghrabi. "Combined sequential decoding and error concealment of H.264 video," IEEE 6th Workshop on Multimedia Signal Processing, p. 299-302, September 2004] uses Joint Source-Channel Decoding (JSCD) to correct the Context-Adaptive Variable-Length Coding (CAVLC) prediction residual coefficients found in data partitions B and C using the number of MBs extracted from the always intact partitions A to impose additional constraints on the solution.

Wang and Yu [as discussed in: Y. Wang and S. Yu. "Joint Source-Channel Decoding for H.264 Coded Video Stream," IEEE Transactions on Consumer Electronics, vol. 51, no 4, p. 1273-1276, November 2005] apply JSCD to correct motion vectors. Their experiment does not comply with the H.264 standard however, as partitions B and C carry horizontal and vertical motion vectors respectively. Sabeva [as discussed in: G. Sabeva, S. Ben Jamaa, M. Kieffer and P. Duhamel. "Robust Decoding of H.264 Encoded Video Transmitted over Wireless Channels," IEEE 8th Workshop on Multimedia Signal Processing, p. 9-13, October 2006] applies JSCD to Context-Adaptive Binary Arithmetic Coding (CABAC) encoded bitstreams on the assumption that each packet carries an entire picture, and so that the number of MBs in a packet is known a priori. As both picture resolution and visual quality both increase, the solution becomes increasingly complex computationally.

Lee [as discussed in W. T. Lee, H. Chen, Y. Hwang and J. J. Chen. "Joint Source-Channel Decoder for H.264 Coded Video Employing Fuzzy Adaptive Method," IEEE International Conference on Multimedia and Expo, p. 755-758, July 2007] proposes to use Fuzzy Logic to feed information back to the channel decoder, although they provide very few details are given about their Fuzzy Logic engine.

Levine [as discussed in: D. Levine, W. E. Lynch and T. Le-Ngoc. "Iterative Joint Source-Channel Decoding of H.264 Compressed Video," IEEE International Symposium on Circuits and Systems, p. 1517-1520, May 2007] and Nguyen [as discussed in: N. Q. Nguyen, W. E. Lynch and T. Le-Ngoc. "Iterative Joint Source-Channel Decoding for H.264 video transmission using virtual checking method at source decoder," 23rd Canadian Conference on Electrical and Computer Engineering, p. 1-4, May 2010] both apply iterative JSCD to a CABAC coded stream. A Slice Candidate Generator produces a list of hypothetical slices by flipping one or more bits in the corrupted slices received. Each candidate is then studied at the semantic level. The bits that seem to have been correctly fixed are fed back into the channel decoder between iterations, until the likeliest bitstream is selected.

Farrugia [as discussed in: R. Farrugia and C. Debono. "Robust decoder-based error control strategy for recovery of H.264/AVC video content," IET Communications, vol. 5, no 13, p. 1928-1938, September 2011] uses a list decoding approach, where the M likeliest feasible bitstreams are reconstructed and evaluated in the pixel domain. Using a value of M=5, the approach produces very good visual results. However, its high computational complexity makes it prohibitively costly for most applications. Weideman applies JSCD to the CAVLC prediction residual coefficients found in data partitions B and C. Using the information from the intact partition A, a stack of hypothetical bitstreams is built and sorted in descending order using a metric in the pixel domain. However, this approach relies heavily on the fact that data partitions A are immune to transmission errors. Without knowledge of the number of MBs present in data partitions B and C, the stack of hypothetical bitstreams cannot be populated.

Trudeau [as discussed in: L. Trudeau, S. Coulombe and S. Pigeon. "Pixel domain referenceless visual degradation detection and error concealment for mobile video," 18th IEEE International Conference on Image Processing, p. 2229-2232, September 2011] proposes to a two-step solution: decoding the corrupted stream without a list of candidates, and concealing the potentially lost MBs. The fit of the decoded and concealed MBs,—the way they connect to the correctly received MBs in the pixel domain—, are then compared, and the best fitting MBs are selected for display. Trudeau does not assume the use of any error resilience or data portioning method.

Accordingly, there exists a need for an improved method and system to address a problem of video packets communicated across communications systems where the video information is altered or lost during transmission due to channel noise or unreliable networks thereby resulting in for example, random bit errors or packet losses in a packet network, damaging compressed video stream and leading to visual distortion at a decoder. Additionally, there exists a need for an improved video correction method and system that obviates or mitigates at least some of the above-presented disadvantages of existing systems.

SUMMARY OF THE INVENTION

In accordance with one aspect of the invention, there is provided an improved video correction method and system based on maximum likelihood (ML) decoding that operates at a slice level or based on a syntax element level maximum likelihood decoding. In a preferred aspect, the method receives and processes information (such as hard information) provided by the channel decoder and utilizes the information to assist in the error correction of video packets transmitted across a communication network. In another aspect of the present invention, soft information (such as Log-likelihood Ratio (LLR)) is utilized in addition to hard decisions obtained from the channel decoder in order to assist with the correction of faulty packets resulting from errors during transmission.

In general, the present invention is directed to estimating the likeliest syntactically valid video slice content based on the erroneous video packets rather than discarding corrupted video packets. In one aspect, a system and method for video error correction at the slice-level is presented. In another aspect, a simplified solution operating at the syntax element-level is presented. In yet a further aspect, performance of the method and system is evaluated using the H.264 baseline profile. Unlike existing video error concealment methods, the present invention is directed towards correcting errors in the bitstream instead of reconstructing missing pixels. A corresponding system for video error correction is also provided.

In one aspect of the present invention, the following exemplary advantages are provided by the video error correction method and system presented herein. In one aspect, the proposed method does not require additional overhead for forward error correction, it can be applied in conjunction with error-resiliency, and it is less computationally intense than existing error concealment techniques. The error correction performance translates into increased visual quality compared to existing error concealment. In another aspect of the invention, simulation results confirm that the error correction method and system presented herein yields improved visual quality, and is also computationally simpler than existing error concealment methods. In a preferred aspect, the method for determining the likeliest syntactically valid slice using the maximum likelihood approach allows reduction in the computational complexity of the video error correction of the present invention.

In accordance with a further aspect of the invention, an improved video correction method and system are provided based on video slice level maximum likelihood decoding, or based on video syntax element-level maximum likelihood decoding.

BRIEF DESCRIPTION OF THE DRAWINGS

Embodiments are illustrated by way of example only and not limitation, with reference to the following drawings in which like reference numerals indicate corresponding or similar elements, and in which.

DESCRIPTION OF THE EMBODIMENTS OF THE INVENTION

Figure 1:
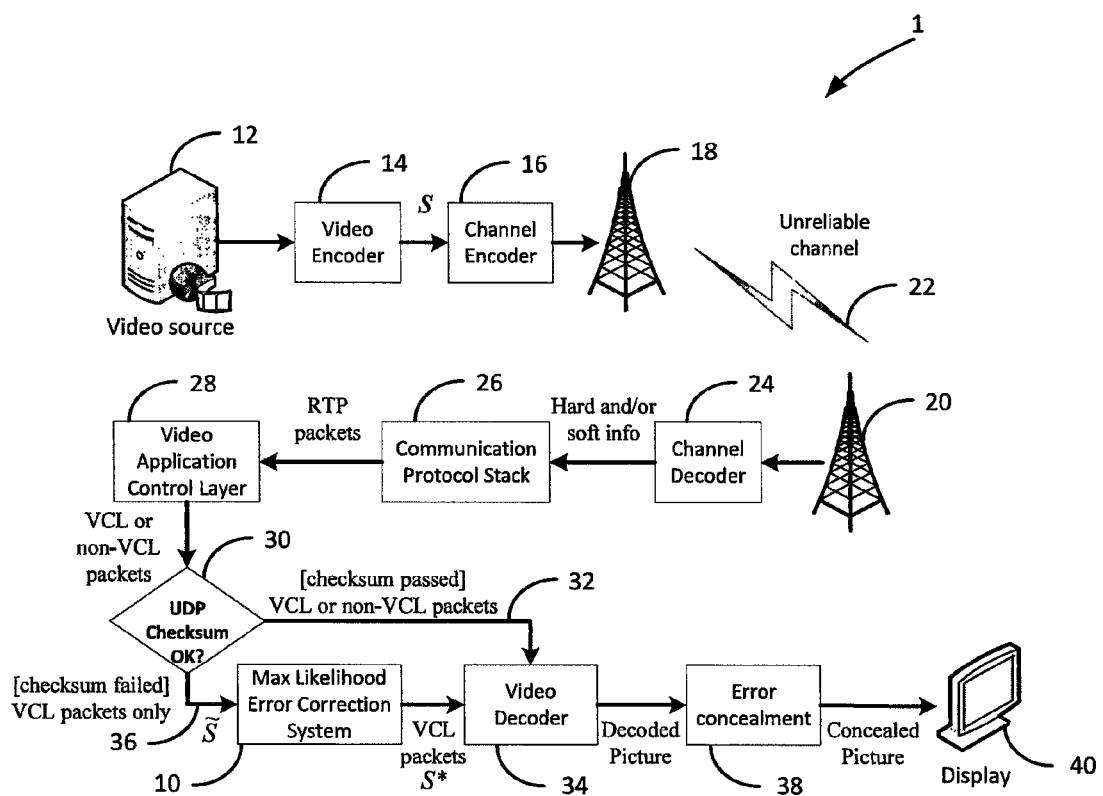
FIG. 1 is a schematic representation illustrating a communication system comprising a maximum likelihood error correction system which provides error correction using hard information in accordance with one embodiment.

I. Communication System Including Maximum Likelihood Error Correction System FIG. 1 shows a communication system 1 comprising a Maximum Likelihood Error Correction System 10 according to embodiments of the present invention. Video stream from Video Source 12 is sent to a Video Encoder 14, which compresses and packages video slices. After channel encoding in the Channel Encoder 16, video slices are sent by a transmitter 18 to their destination receiver 20 via an unreliable channel 22 such as a wireless channel or across the Internet. An unreliable channel 22, can be defined as any communication network or transmission path (e.g. across an IP network) that results in the video packets being lost, or altered during transmission either in real-time or otherwise.

In one aspect of the invention, the communication channel described herein, could be other than a wireline or wireless channel. That is, in this aspect, the channel includes any transmission path where errors are likely to occur between the Channel Encoder 16 and the Channel Decoder 24 of a communication system (e.g. system 1, 500, and 700). In one example, a digital versatile disk (DVD) or Blu-ray disk may represent a channel in which errors due to scratches or other deteriorations (burning the disk is performed at the Channel Encoder 16 and reading the disk is performed at the Channel Decoder 24). Accordingly, as will be appreciated, the methods and systems presented herein for video error correction can be applied, in one aspect to various error prone video communication systems that can be envisaged by a person skilled in the art.

Referring again to the communication system of FIG. 1, it is noted that although a single transmitter 18 and receiver 20 have been illustrated in FIG. 1, a number of transmitters 18 and/or receivers 20 may be envisaged. This applies similarly to the embodiments of FIGS. 5 and 7. For example, the video slices may be broadcast to a plurality of receivers 20 in one embodiment. For ease of illustration, a single transmitter 18, and receiver 20 is described. As will be described herein, the maximum likelihood error correction system aims to compensate for the unreliable links of transmission by providing error correction at the receiving end of transmission. That is, it will be understood by a person skilled in the art that the communication system 1 of FIG. 1 (500 of FIG. 5, 700 of FIG. 7) has been illustrated with a number of pertinent components for exemplary purposes only.

Referring again to FIG. 1, upon reception of the transmitted and possibly distorted video at the destination receiver 20, in one aspect, a Channel Decoder 24 forwards at least one of hard and/or soft information (bits and/or information indicating the reliability of each bit) to the Communication Protocol Stack 26 (and for subsequent use by the max likelihood error correction system 10). As will be discussed herein, soft information relates to any information, used by the channel layer (e.g. channel decoder 24) prior to converting an analog signal to a digital one, indicating a measure of the reliability of each decoded bit. Log likelihood ratios (LLR) are an example of soft information that the physical layer may share with the application layer (e.g. video decoder 34). The soft information could also be a probability measure for each bit being a 0 or a 1. The physical layer typically uses a threshold to decide if a bit is actually a 0, or a 1. As will be described, in one aspect, the soft information can be used to define the probability that a bit should be flipped or inverted (a bit flipping probability) and used by the maximum likelihood error correction system 10 to determine a most likely candidate bitstream for correcting a selected corrupted video packet segment received at the decoder 24. In accordance with another aspect, hard information is provided by the channel decoder 24 to the maximum likelihood error correction system 10 and used to select a most likely candidate bitstream for correcting the errors within the distorted video packet segment received at the channel decoder 24. The hard information relates to the decisions made at the physical layer to convert an analog signal to a digital one (e.g. thresholds for defining the bit that was sent from the encoder 16). Hard information is comprised of bits which are the result of applying a decision based on the soft information available at the physical layer. Typically, a threshold is used to map the soft information to hard information. The hard information is then the sequence of bits available (data packets) provided by the physical to the higher layers.

Once a video packet segment is provided from the channel decoder 24 to the communication protocol stack 26, protocol headers, typically IP headers, are checked for transmission errors. Assuming that the headers are intact, the information is then sent to the Video Application Layer 28 where headers of other protocols, such as Real-Time Transport Protocol (RTP), are used. Within the video application layer 28, a User Datagram Protocol (UDP) check is implemented. The UDP check can include for example, checksums for determining the data integrity, and providing a value to represent detected errors in the transmission of the video packet segment from the channel encoder 16 to the decoder 24.

Depending on the results of the User Datagram Protocol (UDP) checksum (box 30), the video information (e.g. video packet segment) is sent either directly (exit 32 "checksum passed" from box 30) to the Video Decoder 34, or alternatively if there is bit errors detected in the video packet segment where at least a portion of the segment (e.g. either a slice or a syntax element of the segment) contains bit errors caused by the transmission, then the corrupted video packet segment (exit 36 "checksum failed") is sent for video error correction to the maximum likelihood error correction system 10 of the embodiments of the present invention. The checksum failed indicates that the data (e.g. at least a portion of the bitstream for the video packet segment) contains errors.

The video error correction provided by the maximum likelihood error correction system 10 generates a plurality of candidate bitstreams for subsequent use in selecting a most likely candidate bitstream (e.g. a most likely syntactically valid sequence) and for correcting the bit errors in the portion (e.g. slice/syntax) of the video packet segment. That is, as will be described, for each corrupted video packet segment received at the channel decoder, the maximum likelihood error correction system 10 produces the likeliest video slice from the plurality of candidate bitstreams based on at least one of soft information from the channel decoder 24, and hard information from the channel decoder 24. That is, according to an embodiment, at least one of: a soft and hard information associated with a corrupted video packet segment can be used for determining a likelihood for each candidate bitstream and for determining a bit flipping probability associated with inventing the bits in the corrupted portion of the video packet segment. The combination (e.g. product or sum or other combination) of the likelihood for each candidate and the value for the bit flipping probability is used to determine the most likely candidate bit stream used for correction. Further, in one aspect, the likelihood or probability for each candidate bitstream is in dependence upon analyzing a history of previously selected most likely candidate for previously corrected portions generated by the error correction system 10. In another aspect the bit flipping probability associated with inverting the bits within the corrupted portion of the video packet segment is in dependence upon a likelihood of error for each bit within the portion (e.g. channel bit error rate) and optionally, soft information received from the channel decoder 24. Once a most likely candidate bitstream is selected (e.g. by calculating the product or other combination of the likelihood for each candidate bitstream and the bit flipping probability for the corrupted video portion and selecting the candidate having the highest likelihood value based on the combination for the product among the generated candidate bitstreams), then the selected candidate is used to correct or replace the corrupted video portion. The selection of the most likely candidate is further defined in relation to FIGS. 7-11.

As described herein, the term likelihood (e.g. candidate likelihood, bit flipping likelihood, slice likelihood, and/or syntax likelihood) as discussed in accordance with embodiments of the invention can be defined generally as a broad concept that can be implemented using various metrics including any one or more of: a probability, a cost measure, a measure of occurrence, etc. For example, as described herein the maximum likelihood error correction system 10 in FIGS. 1, 7 and 510 in FIG. 5 (e.g. further defined in FIGS. 8-11) finds the most likely slices or syntax elements based on the combination of two components that affect their likelihood.

The first component is the likelihood of each candidate, i.e. how likely this candidate is in comparison to the other possible candidates. Such likelihood can be determined or generated based on for example, one or more of previously decoded information and context, or established based on various probabilistic models, etc. For instance, if the communication system 1, 500, 700 has just decoded macroblock number 33, then it is highly unlikely that the next macroblock to decode be number 32. The second component is the bit flipping likelihood that indicates how likely a candidate is based on the bits to change to obtain this candidate from the received information (e.g. received slice or syntax elements) as well as, in one embodiment, the channel bit error rate. In one embodiment, the bit flipping likelihood decreases when the bit error rate decreases as it becomes less likely that bits are altered during the transmission when the bit error rate is smaller. When only hard information is available, the bit flipping likelihood decreases as the number of flipped bits (modified bits) increases. When soft information is used, the bit flipping likelihood depends on the flipping likelihood of individual bits, the more certain the received bits, the less likely they have been flipped during transmission.

Referring again to FIG. 1, in yet a further embodiment, if after decoding using the video decoder 34, macroblocks (MBs) are still missing because they could not be repaired, they are concealed in the Error Concealment module 38 before being displayed at a Display 40.

Referring to the term macroblock used herein, an exemplary definition of a macroblock (MB) is a processing unit in image and video compression formats that is for example based on linear block transforms. Further a slice is for example, a spatially distinct region of a frame that is encoded separately from another region in the same frames. That is, each frame can be segmented into sequences of macroblocks called slices.

The H.264 video coding standard defines a slice as a container of macroblocks carried between an encoder and a decoder. It may also be defined as a region of a coded picture. In a preferred aspect of the invention, a slice refers to the payload of a communication protocol packet stripped of the protocol headers.

Furthermore, in reference to the syntax elements discussed herein, the concatenation of syntax elements (e.g. element 950 in FIGS. 9 and 11) creates a slice ready for transmission to the decoder. That is, a syntax element is a component or subset of the slice. To ensure interoperability, video standards define a bitstream syntax that must be respected so that the decoder understands what the encoder is communicating. Furthermore, the standard also defines the order in which the coded values shall appear, and the binarization process of the values depending on their meaning. That is, a syntax element refers to a coded value having gone through the binarization process.

It will be appreciated by a person of ordinary skill in the art that the communication system 1 (500 of FIG. 5) described herein is exemplary and that changes may be made to one or more components to accommodate different communication network configurations without affecting the scope of the disclosure herein.

Various individual components 10, 12, 14, 24, 26, 28, 30, 32, 34, 38 of the video correction communication system 1 (or 700 in FIG. 7) may be implemented as hardware and/or software, comprising a processor, and computer readable instructions stored in a memory or another non-transitory computer readable storage medium, for execution by a general purpose or a specialized processor, causing the processor to perform video error correction as will be described in further detail below. Certain components such as Channel Encoder 16, Channel Decoder 24, transmitter/antenna 18, receiver/antenna 20, and Display 40 are preferably implemented as hardware. However, the Channel Encoder 16 and the Channel Decoder 24 may be alternatively implemented as firmware or software.

Figure 7:
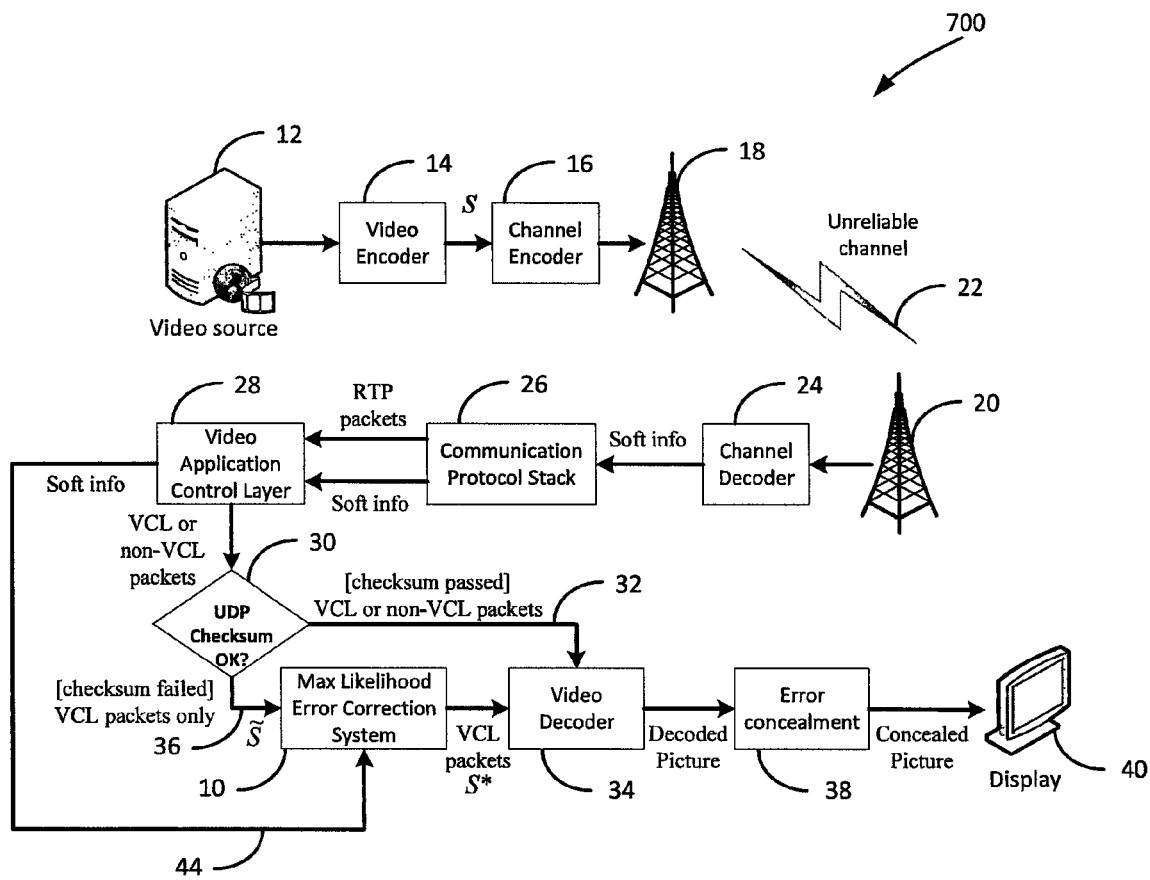
FIG. 7 illustrates a schematic representation of a communication network, comprising a maximum likelihood error correction system in accordance with an alternate embodiment of the present invention using soft information.

In particular, the maximum likelihood error correction system 10 of FIG. 1 or 7 (510 of FIG. 5) comprises in one aspect, computer readable instructions stored in a memory or another non-transitory computer readable storage medium, for execution by a general purpose or a specialized processor, causing the processor to perform video error correction according to maximum likelihood detection as will be described in further detail below. Alternatively, the maximum likelihood error correction system 10, 510 may be also implemented as firmware of a computing device such as a processor. Exemplary architecture of computing device components of the maximum likelihood error correction system 10, 510 and the interaction among the components is depicted in FIGS. 7-11.

Various embodiments of the maximum likelihood error correction system 10 in communication with the communication system 1 are described in Sections II to VI. Section II presents utilizing slice-level maximum likelihood method for the system 10 for correcting transmission errors of the video packets received across channel 22. Section III presents an alternate method requiring decreased computational complexity, in which the maximum likelihood method is applied to each syntax element individually. An embodiment is then presented specifically for four syntax elements present in an H.264 slice header in Section IV. Exemplary experimental results using these four syntax elements with hard information are presented in Section V. Section VI presents the macroblock prediction information correction based on the proposed method, in accordance with one embodiment. Section VII presents the proposed strategy for early termination of the correction process. Section VIII presents the experimental results using soft and hard information with the improvements of section VI and VII. Section IX revisits the more general problem of slice-level maximum likelihood and presents several other embodiments. Section X presents concluding remarks.

II—Slice-Level Maximum Likelihood Decoding

Referring for example to FIG. 1, let $S=\{s_1, s_2, \square, s_N\}$ be the series of syntax elements (SE) in a transmitted slice. For example, the H.264 standard uses the SE first_mb_in_slice to indicate the raster index of the MB coded first in the slice, and the SE mb_type to indicate the MB coding type.

Let $\tilde{S}=\{\tilde{s}_1, \tilde{s}_2, \ldots, \tilde{s}_N\}$ be the series of SEs in a received corrupted slice.

Although both S and $\tilde{S}$ contain the same number of bits, the number of SEs in each slice may differ, due to transmission errors affecting variable length codewords (VLC).

For clarity, let $L_S(\cdot)$ represent the number of syntax elements in a slice, and let $L_B(\cdot)$ represent the number of bits in a slice or a codeword.

Since the maximum likelihood error correction system 10 (510 in FIG. 5) is aware that S (provided as input to the max likelihood error correction system 10) contains at least one erroneous bit, let $H=\{\hat{S}_j|0 \le j < K\}$ be the set of all hypothetical syntactically valid slices of length $L_B(\tilde{S})$ that could have been sent $\forall j$: $L_B(\hat{S}_j)=L_B(\tilde{S})=L_B(S))$, where $\hat{S}_j=\{\hat{s}_{j,1}, \hat{s}_{j,2}, \ldots, \hat{s}_{j,N_j}\}$ is the series of SEs of the $j^{th}$ hypothetical slice.

A syntactically valid slice meets all the requirements of a specific video standard. That is, a syntactically valid slice conforms both to the syntax of the video coding standard and the limitations imposed. For instance, a syntax element may be valid, but the encoder and decoder previously agreed that the value would not be used, making it invalid. In H.264, the use of profiles manages the coding tools that the decoder has to support to correctly decode the stream. Profile support therefore imposes additional constraints that define what consists a syntactically valid slice. For instance, the ranges and restrictions associated with each H.264 SE are defined in subclause 7.4 and Annex A of reference [as discussed in: "Advanced Video Coding for Generic Audiovisual Services," ISO/IEC 14496-10 and ITU-T Recommendation H.264, November 2007] respectively. Note that $\tilde{S}$ is not necessarily an element of H.

Let $S^*=\{s^*_1, s^*_2, \ldots, s^*_{N^*}\}$ be the likeliest series of syntactically valid SEs output by the maximum likelihood error correction system 10 given that $\tilde{S}$ was received at the input for the maximum likelihood error correction system 10. Equation (1) gives the proposed slice-level maximum likelihood decoding approach for finding $S^*$. Equation (1) represents the likelihood function (probability) that $\hat{S}_j$ was sent given that $\tilde{S}$ was received.

$$S^* = \arg\max_{\hat{S}_j \in H} \{P(\hat{S}_j | \tilde{S})\} \quad (1)$$

Intuitively, the maximum likelihood error correction system 10 (510 in FIG. 5) aims to find the candidate slice $\hat{S}_3$ composed of the likeliest codewords that holds the closest resemblance to the received slice $\tilde{S}$. In other words, the maximum likelihood error correction system 10 (510 in FIG. 5) preferably makes as few alterations as possible to the received bits, while improving the likeliness of the codewords. As such, the conditional distribution $P(\hat{S}_j|\tilde{S})$ (1) can be interpreted as a compromise between the likeliness of the codewords present in $\hat{S}_j$ and its Hamming distance with $\tilde{S}$. Using Baye's theorem, we can express Equation (1) as follows:

$$S^* = \arg\max_{\hat{S}_j \in H} \left\{ \frac{P(\tilde{S}|\hat{S}_j) \times P(\hat{S}_j)}{P(\tilde{S})} \right\} = \arg\max_{\hat{S}_j \in H} \{P(\tilde{S}|\hat{S}_j) \times P(\hat{S}_j)\} \quad (2)$$

The denominator has been factored out, as it is constant, and maximizing the numerator is its equivalent.

The bit flipping likelihood $P(\tilde{S}|\hat{S}_j)$ can be modeled as $L_B(\tilde{S})$ independent Bernoulli trials with a fixed success rate, represented by the bit error rate, where the Hamming Distance $d_j$, the number of different bits between the two slices, represents the number of successes:

$$P(\tilde{S}|\hat{S}_j) = \rho^{d_j}(1-\rho)^{L_B(\hat{S}_j)-d_j} \quad (3)$$

The bit error rate $\rho$ can either be estimated from the observed received slices, or it could be a known value guaranteed by the channel's quality of service.

Generally speaking and in reference to FIG. 1, when a corrupted slice is received at the video application layer 28, it is first sent to the maximum likelihood video error correction module 10. There, candidate slices (e.g. potentially likely syntactically valid sequence of bits) are generated by flipping one or more bits of the received slice (e.g. the corrupted slice received at module 10). The likelihood of each candidate slice is evaluated using the product (e.g. or other combination) of the probability of flipping bits and the slice's probability from a syntax perspective. The likeliest slice is selected as the best candidate (e.g. having the highest product value), and it is sent to the video decoder 34. The candidate slice's probability can be defined for example in association with a history of previously selected most likely candidates and/or previously received video packet segments and/or previously decoded bit streams via the decoder 34.

For video slice packets of constant length L, the following equation relates the packet error rate $\rho_p$ and the bit error rate $\rho$ (we assume bit errors are independent of each other):

$$\rho_P = 1 - (1-\rho)^L \quad (3a)$$

For small bit error probability and large packet length, we have:

$$\rho \approx \frac{\rho_p}{L} \quad (3b)$$

It follows that, when all packet have the same length, we can estimate $\rho_{p,k}$, the packet error rate at the $k^{th}$ received slice, as the following moving average:

$$\hat{\rho}_{p,k} = \frac{1}{N} \sum_{i=k-(N-1)}^{k} \varepsilon_i \quad (3c)$$

where N represents the number of slices over which the moving average is performed and $\varepsilon_k$ is a flag equal to 1 if the $k^{th}$ received slice (packet) is corrupted and 0 otherwise. It follows that the estimated bit error rate as a function of k becomes:

$$\hat{\rho}_k \approx \frac{\hat{\rho}_{p,k}}{L} = \frac{1}{L \cdot N} \sum_{i=k-(N-1)}^{k} \varepsilon_i \quad (3d)$$

But in practice, the video packets sizes differ. Let $L_B(\tilde{S}_k)$ represents the length of the $k^{th}$ received slice. We can estimate the bit error rate as a function of k as:

$$\hat{\rho}_k = \frac{1}{N} \sum_{i=k-(N-1)}^{k} \frac{\varepsilon_i}{L_B(\tilde{S}_i)} \quad (3e)$$

In one aspect, the bit error rate is further associated with previously received video packet segments as defined in equations (3c) or (3e).

In another aspect, the bit error rate can be fixed. For instance, for a DVD or Blu-ray application a fixed arbitrary bit error rate can be set (e.g. $10^{-7}$), although it could also be estimated using (3c) or (3e).

The unknown number of MBs carried in a slice combined with the sequential dependencies between SEs makes evaluating $P(\hat{S}_j)$ for a whole slice difficult and impractical. Using the Chain Rule, we can conveniently account for the sequential dependencies between syntax elements and write the probability $P(\hat{S}_j)$ as follows:

$$P(\hat{S}_j) = \prod_{i=1}^{L_S(\hat{S}_j)} P(\hat{s}_{j,i} | \hat{s}_{j,i-1}, \hat{s}_{j,i-2}, \ldots, \hat{s}_{j,1}) = \prod_{i=1}^{L_S(\hat{S}_j)} P\left(\hat{s}_{j,i} \Big| \bigcap_{k=1}^{i-1} \hat{s}_{j,k}\right) \quad (4a)$$

$$P(\hat{S}_j) = P\left(\hat{s}_{j,L_S(\hat{S}_j)} \Big| \bigcap_{k=1}^{L_S(\hat{S}_j)-1} \hat{s}_{j,k}\right) \ldots \quad (4b)$$

$$P\left(\hat{s}_{j,L_S(\hat{S}_j)} \Big| \bigcap_{k=1}^{3} \hat{s}_{j,k}\right) \cdot P\left(\hat{s}_{j,L_S(\hat{S}_j)} \Big| \bigcap_{k=1}^{2} \hat{s}_{j,k}\right) \cdot P(\hat{s}_{j,1})$$

Decomposing the Hamming Distance $d_j$ for each SE (i.e. $d_j = d_{j,1} + d_{j,2} + \square + d_{j,L_s(\hat{S}_j)}$ where $d_{j,i}$ represents the number of different bits between $\hat{s}_{j,i}$ and the bits in slice $\tilde{S}$ at the same positions), we can rewrite Equation (3) as:

$$P(\tilde{S}|\hat{S}_j) = \prod_{i=1}^{L_S(\hat{S}_j)} \rho^{d_{j,i}} (1-\rho)^{L_B(\hat{s}_{j,i}) - d_{j,i}} \quad (5)$$

Substituting Equations (4a) and (5) into Equation (2), we obtain:

$$S^* = \arg\max_{\hat{S}_j \in H} \left\{ \prod_{i=1}^{L_S(\hat{S}_j)} \rho^{d_{j,i}} \cdot (1-\rho)^{L_B(\hat{s}_{j,i}) - d_{j,i}} \times P\left(\hat{s}_{j,i} \Big| \bigcap_{k=1}^{i-1} \hat{s}_{j,k}\right) \right\} \quad (6)$$

Finding the likeliest slice S* at the output of the max likelihood error correction system 10 is computationally expensive, however. Let H+ be a set composed of all possible slices of size $L_B(\tilde{S})$ (it includes syntactically valid as well as invalid slices). The cardinality, or number of elements, of H+, denoted Card(H+), is $2^{L_B(\tilde{S})}$. For an ideal video standard, in terms of compression efficiency, all the elements of H+ would be syntactically valid and H=H+. However, for existing video standards, such as H.264, Card(H) is significantly smaller than Card(H+) (we have $H \subset H^+$), and even without additional constraints, Card (H) will still be extremely large.

The presentation, so far, considered a constant bit error rate. However, channel decoding often can provide soft information indicating the reliability of each bit rather than hard information, the decision for each bit made based on the soft information. Let's suppose that the soft information is provided as a probability that a given bit has the right value. Let's denote $\chi_i$ the probability that the $i^{th}$ bit of slice $\tilde{S}$ has the right value. Let $\rho_i = (1 - \chi_i)$ the probability that the $i^{th}$ bit of slice $\tilde{S}$ is in error. In this case, the likelihood $P(\tilde{S}|\hat{S}_j)$ can be modeled as $L_B(\tilde{S})$ independent Bernoulli trials with a varying success rates $\rho_i$:

$$P(\tilde{S}|\hat{S}_j) = \prod_{i=1}^{L_B(\tilde{S})} \rho_i^{\Delta_{j,i}} (1-\rho_i)^{1-\Delta_{j,i}} \quad (6a)$$

where $\Delta_{j,i}$ represents is a binary value indicating that the $i^{th}$ bits of slices $\tilde{S}$ and $\hat{S}_j$ differ and is defined as:

$$\Delta_{j,i} = \begin{cases} 0, & \text{if } B_i(\tilde{S}) = B_i(\hat{S}_j) \\ 1, & \text{if } B_i(\tilde{S}) \neq B_i(\hat{S}_j) \end{cases} \quad (6b)$$

where $B_i(\bullet)$ is an operator returning the value of the $i^{th}$ bit of a series of bits.

It is interesting to note that in Equation (6a), if we are certain of the $i^{th}$ received bit (i.e. if $z=1=\rho$, $=0$), then any hypothetical sequence $S_1$ for which A=1will lead to $P(\tilde{S}|\hat{S})=0$, representing an impossible case (i.e. $\hat{S}_j$ has zero probability to be the sequence we are looking for).

In one aspect of the invention, additional information obtained from the channel (e.g. soft information defining the reliability of each bit such as the Log likelihood ratios LLRs) are shared from the channel decoder 24 with the max. likelihood error correction system 10 and/or video decoder 34 for improving the detection of likeliest series of syntactically valid SEs provided by the error correction system 10. In this aspect, Joint source-channel decoding (JSCD) provides a means for the channel decoder 24 to share the log-likelihood ratios (LLR) it uses to decide whether the received bit is a 0 or a 1. The LLR values express the natural logarithm of the probability that a 1 was received, over the probability that a 0 was received, given the exact same random channel noise. Let us introduce $T_n$ and $R_n$, two random variables representing a transmitted and a received bit at position n in the bitstream. Then we can write:

$$LLR_n = \log\left(\frac{P(T_n = 1 | y)}{P(T_n = 0 | y)}\right) \quad (6c)$$

where y represents random noise.

With this information, we can replace Equation (6a) with $$P(\tilde{S}|\hat{S}_j) = \prod_{i=1}^{L_B(\tilde{S})} P(R_i = B_i(\tilde{S}) | T_i = B_i(\hat{S}_j)) \quad (6d)$$

Using its Kolmogorov definition, we can expand Equation (6d) to:

$$P(\tilde{S}|\hat{S}_j) = \prod_{i=1}^{L_B(\tilde{S})} \frac{P(R_i = B_i(\tilde{S}) \cap T_i = B_i(\hat{S}_j))}{P(T_i = B_i(\hat{S}_j))} \quad (6e)$$

The numerator in Equation (6e) represents the probability of receiving bit $B_i(\tilde{S})$, while having transmitted bit $B_i(\hat{S}_j)$. There are four possible scenarios, two of which contain transmission errors. Assuming that 0s and 1s are equally subject to transmission errors, we have:

$$P(R_i = B_i(\tilde{S}) \cap T_i = B_i(\hat{S}_j)) = \begin{cases} \frac{\rho}{2}, & \text{if } B_i(\tilde{S}) \neq B_i(\hat{S}_j) \\ \frac{1-\rho}{2}, & \text{if } B_i(\tilde{S}) = B_i(\hat{S}_j) \end{cases} \quad (6f)$$

The LLR values in Equation (6c) can be converted to probabilities as follow:

$$P(T_i = B_i(\hat{S}_j) | y) = \begin{cases} \frac{1}{\exp(LLR_i)+1}, & \text{if } B_i(\hat{S}_j) = 0 \\ \frac{\exp(LLR_i)}{\exp(LLR_i)+1}, & \text{if } B_i(\hat{S}_j) = 1 \end{cases} \quad (6g)$$

The random channel noise present is a constraint in the proposed solution. The goal is not to determine the noise pattern that best explains the received values, but rather to find the actual message sent under the current noise. Therefore, let us assume that:

$$P(T_i = B_i(\hat{S}_j)) \approx P(T_i = B_i(\hat{S}_j) | y) \quad (6h)$$

The conversion cost expressed in Equation (6e) can be computed using Equations (6f) and (6g).

In references [G. Sabeva, S. Ben Jamaa, M. Kieffer and P. Duhamel. "Robust Decoding of H.264 Encoded Video Transmitted over Wireless Channels," IEEE 8th Workshop on Multimedia Signal Processing, p. 9-13, October 2006], [D. Levine, W. E. Lynch and T. Le-Ngoc. "Iterative Joint Source-Channel Decoding of H.264 Compressed Video," IEEE International Symposium on Circuits and Systems, p. 1517-1520, May 2007; N. Q. Nguyen, W. E. Lynch and T. Le-Ngoc. "Iterative Joint Source-Channel Decoding for H.264 video transmission using virtual checking method at source decoder," 23rd Canadian Conference on Electrical and Computer Engineering, p. 1-4, May 2010;], bits from $\tilde{S}$ are modified to create sequences that are then fed to the decoder. The first valid decoded sequence (i.e. that decodes without any error) is then selected as the best sequence. They start by trying all the possibilities of modifying one bit in the sequence and progressively increasing the number of modified bits as needed until a valid decoded sequence is obtained. By doing this, the prior art only maximizes the term $P(\tilde{S}|\hat{S}_j)$ of Equation (2) and assume constant bit error rate as in Equation (5) (ignoring the contribution of $P(\hat{S}_j)$ in Equation (2) and the impact of soft information in Equation (6a)).

As $P(\tilde{S}|\hat{S}_j)$ is rather easy to evaluate compared to $P(\hat{S}_j)$ it is useful to rapidly identify when an hypothetical syntactically valid sequence must be discarded to reduce the solution space (since we know that Card (H) is extremely large).

In one aspect of the present invention, the maximum likelihood error correction system 10, 510 (FIGS. 1 and 5) evaluate $P(\tilde{S}|\hat{S}_j) \times P(\hat{S}_j)$ for various hypothetical sequences $\hat{S}_j$ starting with the smallest Hamming Distances (for hard information) or with bit differences appearing on bits with highest error probability (for soft information). These choices will permit scanning the solution space with candidates with higher values of $P(\tilde{S}|\hat{S}_j)$ first. Also, in practice, since the set of hypothetical syntactically valid slices is not known, in one embodiment, the methods and systems presented herein look for solutions within the set $H^+$ and retain only the solutions leading to an error-free decoding. Let's suppose that for a certain stage of the search process, the maximum value of $P(\tilde{S}|\hat{S}_j) \times P(\hat{S}_j)$ is obtained for hypothetical sequence j. That is, the likelihood of each candidate slice is evaluated using the product of the probability or cost with flipping at least one bit in the received input sequence to the max likelihood error correction system 10 and the probability of the slice.

In a preferred aspect, the probability of flipping a bit integrates the probability of each bit received at the input of system 10 being in error (bit error rate) with the soft information optionally provided by the physical layer (e.g. channel unreliability rate). The bit error rate is an estimation associated to the communication channel used to send slices from an encoder 16 to a decoder 24. This bit error rate (also referred to as probability of flipping bits) is in one aspect, the probability of a bit being in error and it is constant through the slice. The use of a reliable channel leads to a weak bit error rate, driving up the cost of flipping a bit. The use of an unreliable channel leads to a higher bit error rate, reducing the cost of flipping a bit.

In another aspect, as will be described herein, the soft input information is further used to determine individual bit flipping probabilities. In another aspect, without the soft information used to define the bit flipping probability, each bit has the same flipping probability, as the bit error rate is constant. It is further noted that a high cost of flipping bits is associated with low bit flipping probability and low bit flipping likelihood. Conversely, a low cost of flipping bits is associated with high bit flipping probability and high bit flipping likelihood.

Then, knowing that:

$$P(\tilde{S}|\hat{S}_j) \times P(\hat{S}_j) \leq P(\tilde{S}|\hat{S}_j)$$

it is clear that any hypothetical sequence j for which we have:

$$P(\tilde{S}|\hat{S}_j) < P(\tilde{S}|\hat{S}_k) \times P(\hat{S}_k)$$

can't be a better solution and the evaluation of $P(\hat{S}_j)$ is not required (computations can be saved). Using Equation (3), any hypothetical sequence j for which we have:

$$\rho^{d_j}(1-\rho)^{L_B(\hat{S}_j)-d_j} < \rho^{d_k}(1-\rho)^{L_B(\hat{S}_k)-d_k} \times P(\hat{S}_k)$$

$$\Rightarrow \rho^{d_j-d_k}(1-\rho)^{(L_B(\hat{S}_j)-L_B(\hat{S}_k))-(d_j-d_k)} < P(\hat{S}_k)$$

can't be a better solution.
When $L_B(\hat{S}_j) = L_B(\hat{S}_k)$, we have that for any $d_l > d_j$, we have:

$$\rho^{d_j-d_k}(1-\rho)^{-(d_j-d_k)} < P(\hat{S}_k) \Rightarrow \rho^{d_j-d_k}(1-\rho)^{-(d_j-d_k)}$$

That is, if for an Hamming Distance of $d_j$ we can't obtain a better solution than k, then we won't either with $d_l > d_j$ (of course, we assume that $\rho < 0.5$).
Proof:

$$\rho^{d_l-d_k}(1-\rho)^{-(d_l-d_k)} = \rho^{d_j+r-d_k}(1-\rho)^{-(d_j+r-d_k)},$$

with $d_l = d_j + r, r > 0$ $$= \rho^{d_j-d_k}(1-\rho)^{-(d_j-d_k)}\rho^r(1-\rho)^{-r}$$

$$= \rho^{d_j-d_k}(1-\rho)^{-(d_j-d_k)}\left(\frac{\rho}{1-\rho}\right)^r <$$

$$\rho^{d_j-d_k}(1-\rho)^{-(d_j-d_k)} \text{ since } \rho < 0.5$$

$$\Rightarrow \rho^{d_l-d_k}(1-\rho)^{-(d_l-d_k)} < \rho^{d_j-d_k}(1-\rho)^{-(d_j-d_k)} < P(\hat{S}_k)$$

From the previous equations, it is clear that the smaller the value of, the less likely are the solutions with high Hamming Distances. These equations permit us to know when to stop increasing the Hamming Distance in the error correction method of the embodiment of the present invention. This makes sense, because when the probability of error is small, probabilities of many bits having been changed during transport are also low. Similar results can be derived in the case of soft information. Similar derivations can be obtained using the LLRs.

Although the method for video error correction presented above and providing slice level video error correction has benefits over existing prior art solutions, another embodiment is presented for operating on a smaller solution space and following the sequential behavior of existing decoders that is highly desirable for real-time video applications.

III—SE-Level Maximum Likelihood Decoding

In accordance with another aspect of the invention, to alleviate the problems discussed in the previous subsection, a method is proposed herein according to an alternate embodiment of the invention based preferably on the previously decoded syntax element (SE) provided by the channel decoder 24. By maximizing the likelihood of individual SEs, or groups of SEs, rather than the whole slice, the proposed method and system are reducing the cardinality of the solution space since each maximization step eliminates all but one outcome.

In one aspect, when a corrupted slice is received via the receiver 20, it is sent to the maximum likelihood video error correction module 10. A plurality of candidates syntax elements are generated by flipping one or more bits from the input corrupted slice received at system 10. The likelihood of each candidate syntax element (provided as output of 10) is evaluated using the product of the probability of flipping bits and the syntax element's probability. The syntax element's probability can be in dependence upon for example, relevant previously decoded information such as previous syntax elements and/or previously corrected syntax elements. The likeliest syntax element is appended to the likeliest slice, and its value is also shared with the syntax element probability calculator. The process then moves on to the next syntax element if there are bits left in the received slice, or outputs the likeliest slice to the video decoder 34.

Let $C_i = \{\hat{c}_{i,j} | 0 \leq j < M_i\}$ be the codebook containing all the valid codewords the $i^{th}$ SE can use and let $C^* = \{c^*_1, c^*_2, \square, c^*_M\}$ be the series containing the likeliest codewords creating a syntactically valid slice using our proposed method. This method progressively decodes each SE by maximizing the codeword likelihood without considering the SEs in the slice that remain to be decoded. Using a similar development leading to Equation (2), we can derive the SE-level maximum likelihood decoding solution:

$$c_i^* = \arg\max_{\hat{c}_{i,j} \in C_i} \{P(\tilde{S}|\hat{c}_{i,j}) \times P(\hat{c}_{i,j})\} \quad (7)$$

where the likelihood $P(\tilde{S}|\hat{c}_{i,j})$ represents the $i^{th}$ term in Equation (5) and $P(\hat{c}_{i,j})$ represents the probability of a codeword being selected based on the previously decoded SEs.

$$P(\tilde{S}|\hat{c}_{i,j}) = \rho^{d_{i,j}}(1-\rho)^{L_B(c_{i,j})-d_{i,j}} \quad (8)$$

$$P(\hat{c}_{i,j}) = P(\hat{c}_{i,j}|c^*_{i-1}, c^*_{i-2}, \ldots, c^*_1) = P(\hat{c}_{i,j}|\bigcap_{k=1}^{i-1} c^*_k) \quad (9)$$

Substituting Equations (8) and (9) into Equation (7), we obtain:

$$c_i^* = \arg\max_{\hat{c}_{i,j} \in C_i} \{\rho^{d_{i,j}} \cdot (1-\rho)^{L_B(\hat{c}_{i,j})-d_{i,j}} \times P(\hat{c}_{i,j}|\bigcap_{k=1}^{i-1} c^*_k)\} \quad (10)$$

A small adjustment to Equation (10) is required to account for the use of a variable length coding (VLC). The maximization step should consider the same number of bits, as a codeword's exposure to transmission errors increases with its length. Since we are not using the subsequent SEs to maximize the likelihood, we can use the so-called Random Tail Assumption to model the bits beyond the codeword under study as random events to account for the codeword length differences.

It is further noted, that although not explicitly shown in the notations above for simplification of the notations, it is envisaged that, in one aspect, the candidate likelihoods (e.g. as provided by modules 830, 930) depend on previously decoded video information (including non corrected data and possibly corrected data).

Let $\max(L_B(C_i))$ represent the number of bits in the longest codeword in the codebook $C_1$. Assuming that the coded video information is generated by a good binary source (i.e. zeros and ones are equally likely), the uninterpreted bits can be seen as random information:

$$c_i^* = \underset{\hat{c}_{i,j} \in C_i}{\arg\max} \left\{ \rho^{d_{i,j}} \cdot (1-\rho)^{L_B(\hat{c}_{i,j}) - d_{i,j}} \times \right. \tag{11a}$$

$$\left. \frac{1}{2}^{\max(L_B(C_i)) - L_B(\hat{c}_{i,j})} \times P\left(\hat{c}_{i,j} \mid \bigcap_{k=1}^{i-1} c_k^*\right) \right\}$$

The soft-information (LLR), made available using JSCD, can also be used at the syntax-element level. Using the same approach where Equation (6e) replaced Equation (6a), let us replace Equation (8) with the following:

$$P(\tilde{S} \mid \hat{c}_{i,j}) = \prod_{n=1}^{L_B(\hat{c}_{i,j})} \frac{P(R_n = B_{\alpha_{i,j}+n}(\tilde{S}) \cap T_n = B_n(\hat{c}_{i,j}))}{P(T_n = B_n(\hat{c}_{i,j}))} \tag{11b}$$

where $\alpha_{i,j}$ is the position in the bitstream after decoding the SEs prior to the i-th SE according to the slice $S_j$.

Equations (6f) and (6g) can be used to evaluate Equation (11b).

Replacing Equation (8) with Equation (11b), Equation (11a) becomes:

$$c_i^* = \tag{11c}$$

$$\underset{\hat{c}_{i,j} \in C_i}{\arg\max} \left\{ \prod_{n=1}^{L_B(\hat{c}_{i,j})} \frac{P(R_n = B_{\alpha_{i,j}+n}(\tilde{S}) \cap T_n = B_n(\hat{c}_{i,j}))}{P(T_n = B_n(\hat{c}_{i,j}))} \times \frac{1}{2}^{\max(L_B(C_i)) - L_B(\hat{c}_{i,j})} \times P\left(\hat{c}_{i,j} \mid \bigcap_{k=1}^{i-1} c_k^*\right) \right\}$$

IV—Slice Header Correction Based on SE-Level ML Decoding Applied to H.264

Let's consider the scenario where an H.264 Baseline profile encoder sends video coding layer (VCL) packets using unreliable means, and non-VCL packets using reliable means. In addition, let's consider that the MBs are coded following the raster scan order, and that the transmitted slices are limited to a fixed number of bytes and arrive in the order in which they were sent. Finally, let's consider that all the packets sent reach their destination.

To test our approach, we model the following syntax elements: first_mb_in_slice, slice_type, frame_num, and pic_order_cnt_lsb, since the last three SEs all depend on the SE first_mb_in_slice.

The SE first_mb_in_slice represents the raster scan index of the first coded MB carried in the slice. Under our current assumptions, the number of MBs carried in a slice can be expressed as the difference between the values used in consecutive slices associated with the same picture. For clarity, we will use the notation $c_1^{(k-1)}$ to represent the value of a reconstructed codeword from the previous slice, and $\hat{c}_{1,j}$ to represent the $j^{th}$ valid value of first_mb_in_slice in the current slice, the $k^{th}$ slice. In addition, let X, a discrete random variable, represent the difference between $\hat{c}_{1,j}$ and $c_1^{(k-1)}$, corresponding to the number of MBs in the previous slice.

Since we know that transmission errors can affect the number of MBs extracted from a corrupted slice, and because X represents a count, let us assume that X follows a Poisson Distribution. Then, the probability of an outcome $\hat{c}_{1,j}$ can be expressed using the previously reconstructed value as follows:

$$P(\hat{c}_{1,j}) = \frac{e^{-E(X)} E(X)^{(\hat{c}_{1,j} - c_1^{(k-1)})}}{(\hat{c}_{1,j} - c_1^{(k-1)})!} \tag{12}$$

where $E(X)$ is the average number of MBs in a slice and can be estimated using the intact slices previously received. It is worth mentioning that the last slice associated with a picture is not considered in estimating $E(X)$ in our scenario. Limiting the maximum number of bytes a packet may carry introduces the possibility that the last slice contains significantly fewer MBs than the other slices, since MBs associated with different pictures cannot be transported together. In another embodiment, the SE first_mb_in_slice can be modeled as a normal distribution with variance estimated using the number of macroblocks in the previously received intact slices. The normal distribution model performs best when the number of macroblocks in slices is rather constant (small variance).

The SE slice_type indicates the coding type employed in the current slice. Under our current assumptions, the valid outcomes are 0 or 5 for Inter coding, and 2 or 7 for Intra coding. Values above 4, corresponding to the higher range, are used to indicate that all the slices associated with the current picture share the same coding type. We assume that the encoder does not mix values from the lower and higher ranges within a picture, because if it does, the only slice using information in the higher range could be lost during transmission. This behavior has been observed in the H.264/AVC reference software JM 18.2 [as discussed in: Joint Video Team (JVT) of ISO/IEC MPEG & ITU-T VCEG. "H.264/AVC JM reference software," 2011, http://iphome.hhi.de/suehring/tml/]. We can model the SE slice type as two pairwise independent Bernoulli trials. The first experiment checks for the range used, where using a value in the range above 4 indicates a success. The second experiment checks for the coding type where the use of Intra coding indicates a success. Furthermore, the value of the SE first_mb_in_slice ($c_1^*$) must be considered, since the effect of using a slice_type value above 4 is limited by the picture boundaries. The conditional probability distribution of $\hat{c}_{2,j}$ varies, based on the reconstructed value $c_2^{(k-1)}$. This means that, for each combination of $c_2^{(k-1)}$ and $c^*_1$, we obtain a different probability distribution:

$$P(\hat{c}_{2,j} \mid c_1^*) = \tag{13}$$

$$\begin{cases} (1-\alpha) \cdot (\delta(\hat{c}_{2,j}) \cdot (1-\beta) + \delta(\hat{c}_{2,j} - 2) \cdot \beta) + \\ \quad \alpha(\delta(\hat{c}_{2,j} - 5) \cdot (1-\beta) + \delta(\hat{c}_{2,j} - 7) \cdot \beta), & c_1^* = 0 \\ \delta(\hat{c}_{2,j}) \cdot (1-\beta) + \delta(\hat{c}_{2,j} - 2) \cdot \beta, & c_2^{(k-1)} \leq 4, c_1^* \neq 0 \\ \delta(\hat{c}_{2,j} - c_2^{(k-1)}), & c_2^{(k-1)} > 4, c_1^* \neq 0 \end{cases}$$

where $\delta(\cdot)$ is the discrete Dirac Function in Equation (14), $\alpha$ represents the probability that a value of slice_type value above 4 is used, and $\beta$ represents the probability that the slice_type value maps to Intra coding. Both probabilities are estimated from the previously reconstructed slice_type values.

$$\delta(w) = \begin{cases} 1, & w = 0 \\ 0, & w \neq 0 \end{cases} \quad (14)$$

The SEs frame_num and pic_order_cnt_lsb are used to identify pictures. They both represent the least significant bits of monotonously increasing sequences, where the use of a new value is triggered when the value of first_mb_in_slice ($c^*_1$) equals 0 (the start of a new picture). Subclause 7.4.3 of [as discussed in: "Advanced Video Coding for Generic Audiovisual Services," ISO/IEC 14496-10 and ITU-T Recommendation H.264, November 2007] specifically indicates that all slices belonging to the same picture shall use the same values of frame_num and pic_order_cnt_lsb. The only difference is that pic_order_cnt_lsb's increment is typically 2 instead of 1 [as discussed in: J. B. Lee and H. Kalva. "The VC-1 and H.264 Video Compression Standards for Broadcast Video Services (Multimedia Systems and Applications)," Springer, August 2008]. Assuming that slices may be damaged but never lost, this behavior indicates that we only need to consider two outcomes: either the same values present in the previous slice are used, or the least significant bits of the next value in the monotonically increasing sequence are used. As in the case of $\hat{c}_{2,j}$, the conditional probability distributions of $\hat{c}_{3,j}$ and $\hat{c}_{4,j}$ vary based on previously reconstructed values:

$$P(\hat{c}_{3,j} \mid c^*_2, c^*_1) = \begin{cases} \delta(\hat{c}_{3,j} - c_3^{(k-1)}), & c^*_1 \neq 0 \\ \delta(\hat{c}_{3,j} - lsb(c_3^{(k-1)} + 1)), & c^*_1 = 0 \end{cases} \quad (15)$$

$$P(\hat{c}_{4,j} \mid c^*_3, c^*_2, c^*_1) = \begin{cases} \delta(\hat{c}_{4,j} - c_4^{(k-1)}), & c^*_1 \neq 0 \\ \delta(\hat{c}_{4,j} - lsb(c_4^{(k-1)} + 2)), & c^*_1 = 0 \end{cases} \quad (16)$$

where lsb(•) is the modulo operator. The divisors are derived from the SEs log 2_max_frame_num_minus4 and log 2_max_pic_order_cnt_lsb_minus4 found in the active Sequence Parameter Set.

V—Experimental Results

The DVD-NTSC (National Television System Committee) sequences Driving, Opening ceremony, and Whale show were coded using the H.264 reference software JM 18.2 [as discussed in: C. Weidman, P. Kadlec, O. Nemethova and A. Al Moghrabi. "Combined sequential decoding and error concealment of H.264 video," IEEE 6th Workshop on Multimedia Signal Processing, p. 299-302, September 2004]. The first 60 frames of each sequence were selected, where the first picture was coded as an IDR picture and the $31^{st}$ picture was coded using only Intra slices. The other 58 pictures were coded using Inter slices. The packet size was limited to 100 bytes, so as to obtain slices with a variable number of MBs.

The decoder corrects the four SEs as described above, and uses the rest of the slice if it can. The SE first_mb_in_slice has been modeled using a Poisson Distribution. If an invalid codeword is encountered during the decoding of the remaining SEs (i.e. motion vectors, residual coefficients, MB coding types, etc.), the MB containing the syntax error, as well as the remaining MBs in the slice, are discarded.

When flipping bits in generating the candidate slices output from the error correction system 10, the resulting bitstream may no longer conform to the syntax described by the video coding standard. In such cases, a syntax error is detected, and the decoding process (video decoder 34) has to stop due to the sequential dependencies that exist between syntax elements.

The MBs successfully decoded (i.e. those containing only valid SEs) are reconstructed. When all the slices associated with a picture have been decoded, the missing MBs are concealed using the state-of-the-art error concealment method described in [L. Trudeau, S. Coulombe and S. Pigeon. "Pixel domain referenceless visual degradation detection and error concealment for mobile video," 18th IEEE International Conference on Image Processing, p. 2229-2232, September 2011] with the following parameters: $\alpha=0.5$, $\lambda=0.1$, $\sigma_1^2=0.5$, $\sigma_2^2=4$, $T=40$, $T_1=0.01$, and the diffusion process is limited to 30 iterations. Furthermore, the algorithm described in [X. Qian, G. Liu and H. Wang. "Recovering Connected Error Region Based on Adaptive Error Concealment Order Determination," IEEE Transactions on Multimedia, vol. 11, no 4, p. 683-695, June 2009] is used to select the order in which the missing MBs are concealed.

To evaluate the performance of the method of the embodiments of the present invention, we have used three different quantization parameters (QPs), as it will affect the number of MBs per slice. Errors were introduced using a Gilbert-Elliott channel with a fixed bit error rate of $10^{-5}$ and three different average burst lengths (ABL), 2, 4 and 9, to make consecutive slices more or less likely to contain errors. The locations of the erroneous bits were selected with a Uniform Distribution, as we assumed that a bit interleaver was used to combat burst errors. For each combination of QP and ABL, 10 noisy sequences were generated. A total of 270 corrupted sequences were studied.

Table 1 presents both the average number of MBs and the standard deviation per slice type (Intra and Inter) for each combination of sequence and QP. The values increase significantly from QP 28 to QP 40, especially in the case of the Opening ceremony sequence. The effects of such a large standard deviation are shown in Tables 2, 3, and 4 below. As expected, the average number of MBs per slice increases with increasing QP, reaching values between 18 and 88 for QP=40 in the case of Inter slices, which makes error correction very challenging.

TABLE 1

Average and standard deviation of MBs carried per slice

| Sequence | QP | Intra average | Intra standard deviation | Inter average | Inter standard deviation |
|---|---|---|---|---|---|
| Driving | 20 | 1.1 | 0.58 | 1.5 | 1.03 |
|  | 28 | 2.0 | 1.55 | 5.1 | 4.76 |
|  | 40 | 9.2 | 5.30 | 38.6 | 15.3 |
| Opening ceremony | 20 | 1.0 | 0.21 | 1.7 | 1.51 |
|  | 28 | 1.3 | 1.06 | 8.0 | 14.2 |
|  | 40 | 4.0 | 3.39 | 88.3 | 112.9 |
| Whale show | 20 | 1.1 | 0.31 | 1.1 | 0.43 |
|  | 28 | 1.6 | 1.00 | 2.3 | 1.75 |
|  | 40 | 6.7 | 4.16 | 18.0 | 14.28 |

Tables 2, 3, and 4 list the statistical errors committed by the proposed approach applied at the SE level. Type I errors refer to the cases where the received value of first_mb_in_slice was actually correct and the reconstructed value, after our correction method was applied, was incorrect (i.e. the correction should not have changed the value). Type II errors refer to the cases where the received value was incorrect and remained unchanged after the correction step (i.e. the correction should have changed the value, but it didn't).

The effect of a very large average and standard deviation, present in Table 1, when a QP of 40 is used to compress the Opening ceremony sequence, is illustrated in Table 4. As the ABL increases, the probability of committing type I errors increases to nearly 50%. However, the number of type I statistical errors committed with the other sequences is very low, no matter what the conditions were.

TABLE 2

Statistical errors for the first_mb_in_slice SE (ABL 2)

| Sequence | QP | Corrupted slices | Type I | Type II errors |
|---|---|---|---|---|
| Driving | 20 | 387 | 1 | 0 |
|  | 28 | 171 | 6 | 1 |
|  | 40 | 37 | 0 | 1 |
| Opening ceremony | 20 | 241 | 0 | 0 |
|  | 28 | 90 | 2 | 2 |
|  | 40 | 25 | 7 | 1 |
| Whale show | 20 | 365 | 0 | 1 |
|  | 28 | 223 | 0 | 0 |
|  | 40 | 42 | 4 | 0 |

TABLE 3

Statistical errors for the first_mb_in_slice SE (ABL 4)

| Sequence | QP | Corrupted slices | Type I errors | Type II errors |
|---|---|---|---|---|
| Driving | 20 | 142 | 0 | 1 |
|  | 28 | 148 | 10 | 2 |
|  | 40 | 38 | 2 | 0 |
| Opening ceremony | 20 | 182 | 2 | 2 |
|  | 28 | 144 | 9 | 0 |
|  | 40 | 45 | 22 | 1 |
| Whale show | 20 | 89 | 0 | 0 |
|  | 28 | 164 | 2 | 0 |
|  | 40 | 42 | 5 | 1 |

TABLE 4

Statistical errors for the first_mb_in_slice SE (ABL 9)

| Sequences | QP | Corrupted | Type I errors | Type II errors |
|---|---|---|---|---|
| Driving | 20 | 113 | 0 | 1 |
|  | 28 | 109 | 14 | 3 |
|  | 40 | 102 | 4 | 0 |
| Opening ceremony | 20 | 198 | 25 | 2 |
|  | 28 | 89 | 21 | 0 |
|  | 40 | 77 | 36 | 1 |
| Whale show | 20 | 108 | 0 | 0 |
|  | 28 | 135 | 0 | 0 |
|  | 40 | 157 | 5 | 1 |

Figure 2:
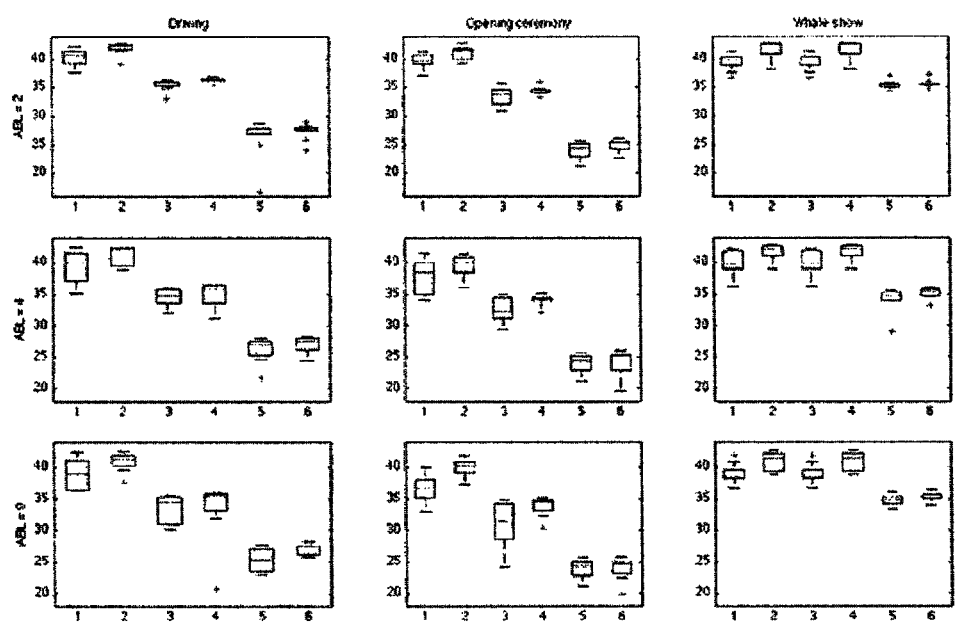
FIG. 2 shows a comparison measurement of Peak Signal-to-Noise Ratio (PSNR) distributions using existing error concealment methods versus exemplary results according to a method of one embodiment of the present invention.

FIG. 2 presents the PSNR distribution of all three pictures affected by transmission errors. The box plots appear in pairs. The first box plot represents the PSNR distribution when a state-of-the-art concealment method is used, combined with an optimal concealment order selection. The second box plot represents the PSNR distribution when our proposed method is used. Each row of box plots is associated with an ABL, and each column is associated with a video sequence. The vertical "y" axis on plots of FIG. 2 shows ABL values.

Referring again to FIG. 2, in each plot, measurements 1, 3, and 5 correspond to PSNR obtained with state-of-the-art error concealment with QP=20, 28, and 40 respectively. Measurements 2, 4, and 6 correspond to PSNR obtained with the method of the embodiment of the invention followed by the same state-of-the-art error concealment method with QP-20, 28, and 40 respectively. The rows correspond to ABL values of 2, 4, and 9 respectively. The columns correspond to the video sequences Driving, Opening ceremony, and Whale show respectively.

In more detail, FIG. 2 shows PSNR distributions using a comparison of previous concealment [L. Trudeau, S. Coulombe and S. Pigeon. "Pixel domain referenceless visual degradation detection and error concealment for mobile video," 18th IEEE International Conference on Image Processing, p. 2229-2232, September 2011], [X. Qian, G. Liu and H. Wang. "Recovering Connected Error Region Based on Adaptive Error Concealment Order Determination," IEEE Transactions on Multimedia, vol. 11, no 4, p. 683-695, June 2009] compared to our proposed method according to the embodiments of the invention. Measurement boxes 1, 3, and 5 on each plot correspond to state-of-the-art error concealment with QP=20, 28 and 40 respectively. Measurement boxes 2, 4, and 6 on each plot correspond to the proposed error correction method of the SE-Level embodiment of the invention followed by the same state-of-the-art error concealment method with QP=20, 28 and 40 respectively. The rows correspond to ABL values of 2, 4 and 9 respectively. The columns correspond to the video sequences Driving, Opening ceremony, and Whale show respectively.

The results show that a higher PSNR is expected with the method of the present invention. Although there are statistical errors, the vast majority of the observations are higher when error correction is applied first, as this reduces the area where error concealment is applied. Indeed, the error concealment method performs better when MBs are successfully repaired from corrupted slices. Over the three sequences tested, for an ABL value of 2 and a QP of 28, the average expected PSNR gains range from 0.75 dB to 2.22 dB with peaks at 3.67 dB. The worst loss observed (concealment performed better than our method) was of −0.32 dB.

VI. Macroblock Prediction Information Correction Based on SE-Level ML Decoding Applied to H.264

The H.264 video standard achieves better compression by using more elaborate prediction schemes, signaled before the residual information, than its previous standards. The availability of the prediction scheme varies throughout the decoding process. For instance, intra prediction is limited by the value of constrained_intra_pred_flag syntax element present in the active Picture Parameter Set (PPS), the address of the current MB, and the slice boundaries—Arbitrary Slice Ordering (ASO) ensures slices can be decoded independently.

The MB's prediction type is dictated by the Profile restrictions as well as the latest value of the slice_type SE. Intra slices must use either Intra_4×4 or Intra_8×8, I_PCM or one of 24 Intra_16×16 prediction types. Inter slices can also use one of 5 motion compensation prediction schemes or P_Skip. The information is carried by a combination of the SEs mb_skip_run and mb_type. The former, only present in Inter slices, indicates the number of skipped MBs before the next coded MB. The latter signals the prediction mode of the coded MB.

We know that both the Profile and the latest slice_type value restrict the codebook $C_i$ in Equation (11c). Additionally, from Table 7-11 in Rec. H.264 [as discussed in: "Advanced Video Coding for Generic Audiovisual Services," ISO/IEC 14496-10 and ITU-T Recommendation H.264, November 2007], we know that Intra prediction modes use predefined luminance predictions (e.g. horizontal, vertical, etc.). These prediction modes may not be valid given the address of the current MB, as the prediction values may be unavailable. Combining the Profile, the slice's type and the address, we can build the codebook $C_i$.

The syntax element mb_type can be modeled with the value of mb_type used by the co-located macroblock in the previous picture:

$$P(mb\_type=\hat{c}_{i,j}|\cap_{k=1}^{i-1}c_k^*)=P(mb\_type=\hat{c}_{i,j}|mb\_type_{t-1}=c^*) \quad (17)$$

In Equation (17), $mb\_type_{t-1}$ represents the value of mb_type of the co-located macroblock in the previous picture.

The mb_skip_run SE represents the number of skipped MBs before the next coded MB or the end-of-slice. From its definition, the SE can be modeled as a Geometric Distribution, where a failure is defined as the use of the Skipped coding type, and a success as the use of a non-Skipped coding type or the end of the slice—signaled by the more_data( ) macro in Rec. H.264 [as discussed in: "Advanced Video Coding for Generic Audiovisual Services," ISO/IEC 14496-10 and ITU-T Recommendation H.264, November 2007].

$$P(mb\_skip\_run=\hat{c}_{i,j})=(1-p)^{c_{ij}-1}p \quad (18a)$$

However, Equation (18a) cannot be used by itself to evaluate the likelihood, as we would not be comparing the same number or Bernoulli trials. Additionally, we know that the success rate in Equation (18a) is not constant, as the coding types used by the neighboring MBs are considered to evaluate the likelihood.

Using a Markov Model, we can account for the fact that the probability of using a Skipped MB varies with the spatial location (i.e. with the previously selected coding types). Furthermore, we can also express the mb_skip_run SE as a Geometric distribution:

$$P\left(mb\_skip\_run = \hat{c}_{i,j} \mid \bigcap_{k=1}^{i-1} c_k^*\right) = \quad (18b)$$

$$\prod_{n=0}^{\hat{c}_{i,j}} P\left(P\_Skip_n \mid \bigcap_{k=1}^{i-1} c_k^*\right) \times \left(1 - P\left(P\_Skip_{\hat{c}_{i,j}+1} \mid \bigcap_{k=1}^{i-1} c_k^*\right)\right)$$

where $P\_Skip_n$ is the likelihood that the $n^{th}$ MB from the current address is skipped instead of coded.

Now, even if the Markov model does not necessarily mimic the monotonically decreasing nature of a Geometric distribution, we still have to account for the fact that skipping MBs reduces the number of MBs left. Since we know how many MBs will be left after the skipped MBs, we can use a simple Binomial Distribution. In doing so, all possibilities will contain the same number of MBs, making it easier to compare the likelihoods.

$$P\left(mb\_skip\_run = \hat{c}_{i,j} \mid \bigcap_{k=1}^{i-1} c_k^*\right) = \prod_{n=0}^{\hat{c}_{i,j}} P\left(P\_Skip_n \mid \bigcap_{k=1}^{i-1} c_k^*\right) \times \quad (18c)$$

$$\left(1 - P\left(P\_Skip_{\hat{c}_{i,j}+1} \mid \bigcap_{k=1}^{i-1} c_k^*\right)\right) \times Binopdf(r, s, p)$$

where r represents the number of remaining MBs, s, the number of successes observed, and p, the success rate. Both s and p are unknown however. The success rate could be estimated using the previous frames, but the number of successes would still be undetermined. We could also continue using the Markov Model used in the first half of Equation (18c), but that would increase the computational complexity, as the location of the successes would have to be considered. A simpler approach is to use an unbiased distribution where the success rate is 0.5: the remaining MBs are either coded or skipped.

$$P\left(mb\_skip\_run = \hat{c}_{i,j} \mid \bigcap_{k=1}^{i-1} c_k^*\right) = \quad (18d)$$

$$\prod_{n=0}^{\hat{c}_{i,j}} P\left(P\_Skip_n \mid \bigcap_{k=1}^{i-1} c_k^*\right) \times \left(1 - P\left(P\_Skip_{\hat{c}_{i,j}+1} \mid \bigcap_{k=1}^{i-1} c_k^*\right)\right) \times \left(\frac{1}{2}\right)^r$$

Intra 4×4 MBs are used when multiple luminance prediction schemes perform better than a common prediction scheme for all 256 pixels. In total, there are 9 different schemes, signaled by the SEs prev_intra4×4_pred_mode_flag and rem_intra4×4_pred_mode.

The decoding process first derives a scheme from the left and top 4×4 blocks, when available. The first SE indicates whether the decoder should use the derived value or a different value. The second SE, when present, indicated one of the 8 other schemes to use.

From a correction stand point, it is easier to view both fixed-length SEs as a variable-length SE we will call I4×4Pred. The shortest codeword signals the use of the derived prediction scheme will the longer ones indicate the use of a different prediction scheme. Therefore, we need to evaluate the likelihood of all 9 prediction schemes in order to select the likeliest one. It is worth mentioning that using co-located information in this case will introduce highly variable results as Intra coding is generally used less often than Inter coding.

Since the derivation process already exploits the spatial dependencies with the prediction scheme of the left and top 4×4 blocks, we will use the product of the conditional distributions to evaluate the likelihood of each prediction scheme.

$$P(I4\times4Pred=\hat{c}_{i,j}|\cap_{k=1}^{i-1})=P(I4\times4Pred=\hat{c}_{i,j}I4\times 4Pred_{Left}=c^*_{Left}\cap I4\times4Pred_{Top}=c^*_{Top}) \quad (19)$$

The intra_chroma_pred_mode SE, present in all types of Intra MBS, except I_PCM MBs, uses one of four possible values: DC, Horizontal, Vertical or Plane. The coded value uses an unsigned exponential Golomb representation. We can also exploit the spatial correlation with the top and left values used for the I4×4Pred SE.

$$P(intra\_chroma\_pred\_mode=c_{i,j}|\cap_{k=1}^{i-1})=P(intra\_chroma\_pred\_mode=c_{i,j}|intra\_chroma\_pred\_mode_{Left}=c^*_{Left}\cap intra\_chroma\_pred\_mode_{Top}=c^*_{Top}) \quad (20)$$

When an Inter_8×8 prediction is used, four sub_mb_type SEs are transmitted to further refine the motion compensated prediction process.

Much like it was the case with the Intra 4×4 luminance prediction, the segmentation information is only available when Inter 8×8 coding is signaled. However, we can better express the problem by modeling the number of motion vectors the current MB is likely to use. The combination of the four sub_mb_type SE values translate to a number of motion vectors (MV). Assuming Intra coded MBs have an MV count of 0, we can use the neighboring MBs' MV count to evaluate the likelihood of the combined four values.

Since we already know that there are at least 4 MVs, we need to evaluate the likelihood of there being 4 to 16 MVs, with the exception of 15 MVs as no combination uses 15 MVs.

$$P(\text{MVCout} = \hat{c}_{i,j} | \cap_{k=1}^{i-1}) = P(\text{MVCout} = \hat{c}_{i,j} | \text{MVCount}_{Left} = c^*_{Left} \cap \text{MVCount}_{Top} = c^*_{Top}) \quad (21)$$

In Equation (21), MVCount represents the number of MVs, and $\text{MVCount}_{Left}$ and $\text{MVCount}_{Top}$ represent the number of MVs used by the MB left and above the current MB, when they are available.

The information carried by the mvd_l0 SEs represents the difference between the median MV and the actual MV used. Let us first model the residual MV using a Bivariate Normal Distribution centered at the median MV. The variance in each direction can be studied over time using the intact residual MVs. This approach also takes advantage of the fact that the mvd_l0 SEs come in pairs, strengthening the correction performances.

$$P(MV = (\hat{c}_{i,j}, \hat{c}_{i+1,j}) | MV_{median} = (\mu_x, \mu_y)) = \frac{1}{2\pi\sigma_x\sigma_y} e^{\frac{-1}{2} \times \left(\frac{(x-\mu_x)^2}{\sigma_x^2} + \frac{(u-\mu_y)^2}{\sigma_y^2}\right)} \quad (22)$$

The variance in both horizontal and vertical directions can be tracked during the entire decoding process.

Finally, the coded_block_pattern SE is present either when Intra_4×4 or any Inter, except P_Skip, is used. It signals the presence of coded residual information. This information is actually hidden in the different Intra_16×16 prediction modes seen in Table 7-11 Rec. H.264 [as discussed in: "Advanced Video Coding for Generic Audiovisual Services," ISO/IEC 14496-10 and ITU-T Recommendation H.264, November 2007].

$$P(\text{coded\_block\_pattern} = \hat{c}_{i,j} | \cap_{k=1}^{i-1} c^*_k = P(\text{coded\_block\_pattern} = \hat{c}_{i,j} | \text{coded\_block\_pattern} = \hat{c}_{Left} \cap \text{coded\_block\_pattern} = \hat{c}_{Top}) \quad (23)$$

VII. Correction Process Early Termination Strategy

The probability distributions for the syntax elements used to communicate the prediction information described in Section VI have been added to those described in Section IV for the H.264 slice headers. The syntax elements used to describe the CAVLC residual information (e.g. coeff_token, total_zeros, run_before, etc.) have not been modeled yet, but invalid values are detected while decoding.

Errors in the residual information leading to a syntactically valid sequence of codewords are problematic, since the prediction information is interlaced with the residual information. Upon desynchronization, the correction process will force the use of a valid codeword in any modeled syntax element, no matter how unlikely. To address this problem, we use a threshold to stop the correction process when the selected codeword seems too unlikely. Exploiting the fact that most codewords are short, it becomes highly improbable that multiple bits inside the same codeword are erroneous, even at very high bit error rates. Thus, we propose to stop the correction process when the Hamming distance between the likeliest codeword and the received bits is greater than a threshold T1 (e.g. T1=1 in our simulations).

Furthermore, our implementation uses a greedy approach to find the series of likeliest codewords where a single codeword is retained at each step, and the remaining outcomes are discarded. Type I errors (i.e. changing intact bits) and Type II errors (i.e. keeping corrupted bits) may desynchronize the bitstream, leading to an unlikely path requiring that multiple bits be flipped. To avoid following such a path, we stop the correction process when the ratio of flipped bits over interpreted bits exceeds a threshold T2 (e.g. T2=10-2 in our simulations). Once the decoding process stops, either because the slice was entirely decoded, an error was detected, or a threshold was reached, the extracted MBs are reconstructed and the missing MBs, if any, are concealed.

VIII. Experimental Results Using Soft and Hard Outputs

To evaluate the gains from introducing soft-output information in our framework, we coded the 4CIF sequences "city", "crew", "harbour", "ice", and "soccer", and the 480P sequences "driving", "opening ceremony", and "whale show", using the JM18.2 [as discussed in: C. Weidman, P. Kadlec, O. Nemethova and A. Al Moghrabi. "Combined sequential decoding and error concealment of H.264 video," IEEE 6th Workshop on Multimedia Signal Processing, p. 299-302, September 2004] with four different parameter settings, and all using the Baseline Profile.

We applied a combination of fixed QPs (24 and 36) and a maximum packet size (200 and 300 bytes) to vary the average number of MBs carried in a slice, as well as the amount of residual information transmitted. We chose this approach as a way to study the importance of modeling the residual information (i.e. CAVLC syntax elements). The MBs were coded following the raster scan order, and no additional H.264 error robustness tools were used. The coded sequences were submitted to a network simulator. The channel coder used QAM to encode 16-bit symbols using Gray codes without any additional FEC. The packets from one randomly selected picture were then submitted to an AWGN channel to simulate a bit error rate of 10-3. We used 20 different random error patterns for each coded sequence, targeting 5% of the slices in the pictures. We used a threshold T1 of 1, and a threshold T2 of 10-2. The SE first_mb_in_slice has been modeled using a normal distribution.

The corrupted sequences were then decoded using three different approaches: 1) discarding all corrupted packets and applying state-of-the-art error concealment on the missing MBs (STBMA+PDE) [as discussed in L. Trudeau, S. Coulombe and S. Pigeon. "Pixel domain referenceless visual degradation detection and error concealment for mobile video," 18th IEEE International Conference on Image Processing, p. 2229-2232, September 2011], as, to our knowledge, this is the best and most cited method; 2) correcting the corrupted packets using the proposed maximum likelihood framework, but without soft-output information (HO-MLD); and 3) correcting the corrupted packets using soft-output information (SO-MLD). The remaining missing MBs in 2) and 3) were concealed using STBMA+PDE.

The PSNR of the pictures containing corrupted slices were compared. Our observations on the test scenarios described indicate an overall PSNR improvement of 0.96·dB when using SO-MLD over STBMA+PDE. Table 5 presents the average PSNR gains of HO-MLD and SO-MLD over STBMA+PDE with QP=36. The performance of our approach decreases with lower QP values as the quantity of residual information increases. The highest peaks observed in the "harbour" and "driving" sequences are associated with two cases where the corrupted packets were perfectly corrected. They are a clear indication that modeling the CAVLC syntax elements would yield better results.

TABLE 5

PSNR gains (dB) of HO-MLD and
SO-MLD over STBMA + PDE (QP = 36)

| | | HO-MLD | | SO-MLD | |
|---|---|---|---|---|---|
| Sequence | Size (bytes) | Average (dB) | Peak (dB) | Average (dB) | Peak (dB) |
| city | 200 | 0.49 | 8.31 | 0.55 | 8.33 |
|  | 300 | 1.39 | 6.64 | 1.58 | 7.94 |
| crew | 200 | 0.06 | 5.40 | 0.14 | 6.64 |
|  | 300 | 0.71 | 8.67 | 0.93 | 9.74 |
| harbour | 200 | 0.48 | 6.02 | 0.77 | 6.02 |
|  | 300 | −0.32 | 13.99 | 0.50 | 10.11 |
| ice | 200 | 0.27 | 1.83 | 0.32 | 1.83 |
|  | 300 | 0.07 | 2.69 | 0.04 | 2.96 |
| soccer | 200 | 0.87 | 3.14 | 0.90 | 2.80 |
|  | 300 | 0.45 | 3.06 | 0.62 | 3.06 |
| driving | 200 | −0.33 | 5.00 | 0.17 | 5.00 |
|  | 300 | 0.23 | 12.15 | 1.03 | 12.15 |
| ceremony | 200 | 1.77 | 9.42 | 1.80 | 9.42 |
|  | 300 | 1.30 | 7.05 | 1.47 | 7.05 |
| whale-show | 200 | 1.53 | 10.36 | 1.76 | 9.11 |
|  | 300 | 2.56 | 8.24 | 2.79 | 8.02 |

A comparison of HO-MLD and SO-MLD is presented in Table 6. The results indicate that SO-MLD yields better PSNR values, although HO-MLD extracts more MBs. Thus, the quality of the extracted MBs prevails over their quantity. From this, we conclude that soft-output information improves the decisions of our maximum likelihood framework.

TABLE 6

Average percentage of saved MBs in a corrupted slice and the
average PSNR gain of SO-MLD over HO-MLD (QP = 36)

| Sequence | Lost MBs | HO-MLD (%) | SO-MLD (%) | Delta PSNR (dB) |
|---|---|---|---|---|
| city | 8980 | 30 | 25 | 0.11 |
| crew | 9507 | 22 | 19 | 0.15 |
| harbour | 2920 | 55 | 56 | 0.56 |
| ice | 8726 | 3 | 3 | 0 |
| soccer | 5085 | 22 | 19 | 0.10 |
| driving | 12154 | 46 | 48 | 0.32 |
| ceremony | 10444 | 19 | 16 | 0.07 |
| whale-show | 7657 | 71 | 71 | 0.22 |

IX. Application to Slice-Level Maximum Likelihood Decoding

The methodology developed for maximum likelihood decoding at the SE level can be extended at the slice level. Similar to the decoding approach presented in section III, we will use the conditional probability (i.e. the probability of a SE as a function of previously decoded SEs) to take into account the sequential behavior of existing video decoders. However, instead of eliminating all but the likeliest outcome, we will consider, in an embodiment of the invention for the slice-level maximum likelihood decoding, all possible candidates. Similar to a Viterbi decoder, all the possible paths (i.e. every combinations of SEs) are examined using a trellis to find the likeliest path (the sequence of SEs having the highest likelihood). The depth of the trellis is i for the $i^{th}$ SE in the slice. The vertices of the trellis represent all the valid SE values for each depth value. The edges connecting depth i−1 to depth i represent the product term i in Equation (6).

For a bitstream segment composed of SEs for which probabilities have not been established (for instance any SE, except the 4 we have defined above for our H.264 illustrative example, such as residual information), we exclude the path composed of this segment if it is syntactically wrong (i.e. if we can't decode successfully this segment). This can be seen as assigning probabilities to the valid SE value using a Uniform Distribution and assigning a probability of 0 to any other value, thus making sure syntactically invalid segments are discarded. The decision then becomes linked to the Hamming Distance of the segment. This is illustrated for the case of 3 SEs with established probabilities followed by a segment for which probabilities have not been established for the SEs it is composed of.

After creating the trellis for the whole video slice (whole packet), we retain the path with the maximum likelihood as expressed by Equation (6); the path that provides the maximum value for the product of the edges along that path.

Figure 3:
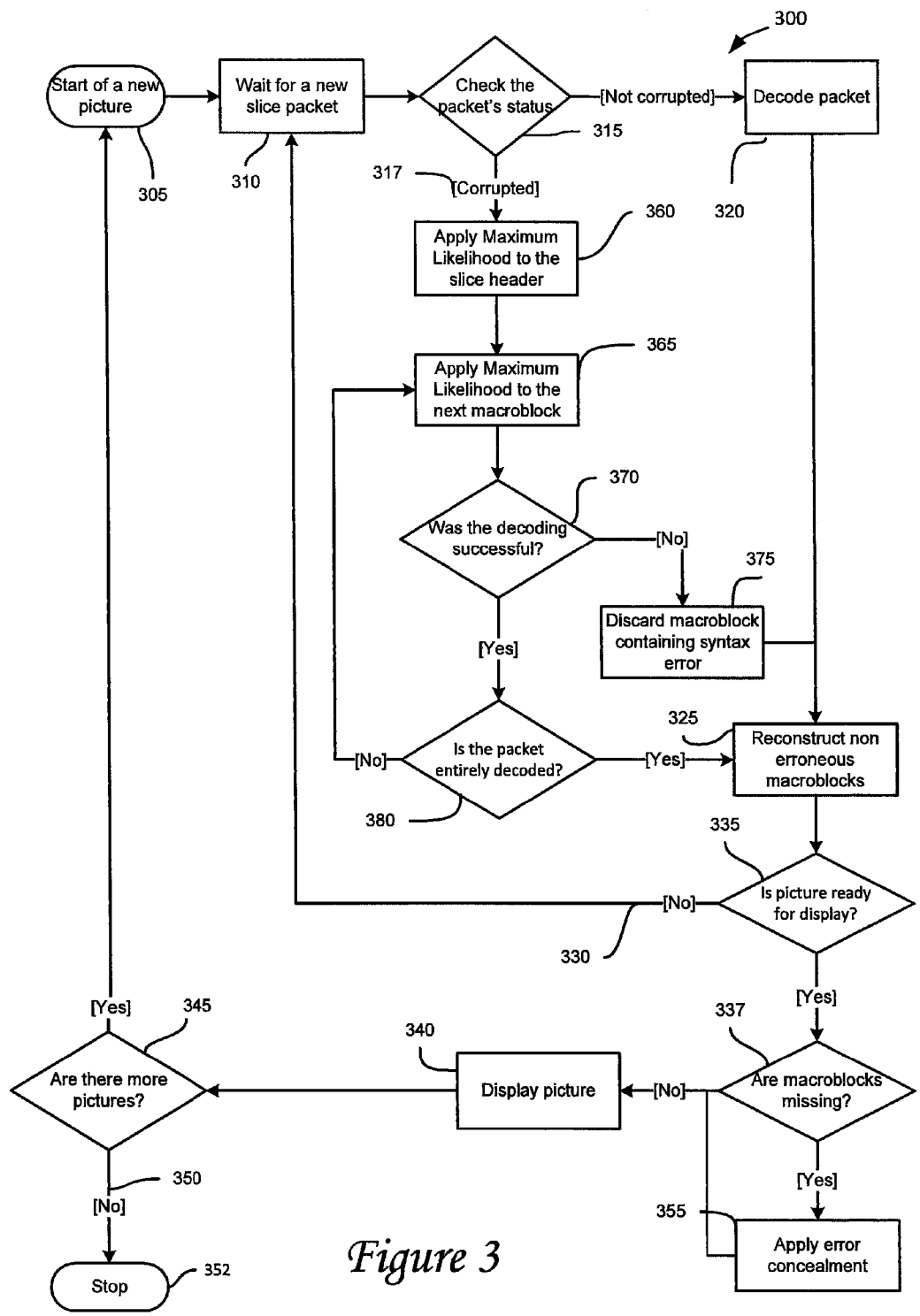
FIG. 3 shows a flowchart of a method of the maximum likelihood error correction system of FIG. 1 in accordance with an embodiment.

FIG. 3 shows a flowchart illustrating the maximum likelihood video error correction system 300 of the communication system presented in FIG. 1. The system starts with a new picture at step 305. The system waits for the arrival of new video packets in step wait for new video packets 310 where they are sent to check the packet status 315 were they are either directly sent to the decode packet process 320 (exit 315 "not corrupted") or are sent the apply maximum likelihood to the slice header process 360 (exit 317 "corrupted"). Once the slice header has been corrected in step 360, the maximum likelihood is applied to the next MB in apply maximum likelihood to the next macroblock process 365. Then decoding is validated in the was the decoding successful process 370. If an error is encountered during the decoding operation (exit 370 "no"), then the macroblock containing the syntax error is discarded in discard macroblock containing syntax error 375, and all non erroneous macroblocks are reconstructed in reconstruct erroneous macroblocks 325.

Following the reconstruction process, error concealment 355 is applied if the picture is ready for display (exit 335 "no") and macroblocks are missing (exit 337 "yes"), before the picture is displayed 340. However, the next slice packet is awaited in 310 if the picture is not ready for display (exit 330 "yes").

After each picture has been displayed in display picture 340, the system will stop in step 352 if no more pictures are expected (exit 350 "no").

Figure 4:
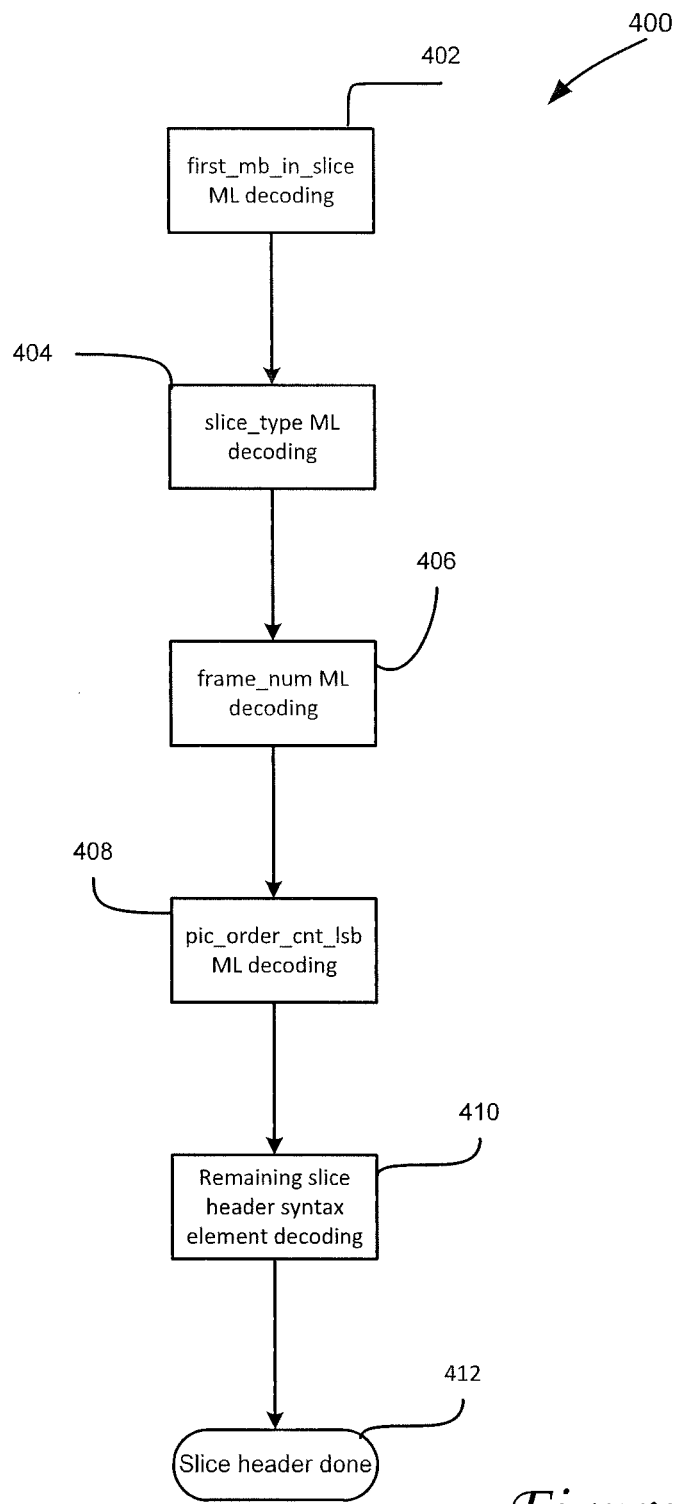
FIG. 4 shows a flowchart of a method applying maximum likelihood to slice headers in one embodiment of the present invention.

FIG. 4 shows the flowchart illustrating the SE level maximum likelihood decoder of step 360 of FIG. 3 applied to the 4 syntax elements modeled in one embodiment of the proposed invention. The SE first_mb_in_slice is first decoded in 402. The result is then sent to the SE slice_type ML decoding 404, followed by the SE frame_num ML decoding 406, and finally to the SE pic_order_cnt_lsb ML decoding 408. Once the fields have been corrected, the remaining SEs in the slice header are decoded in step 410.

Figure 6:
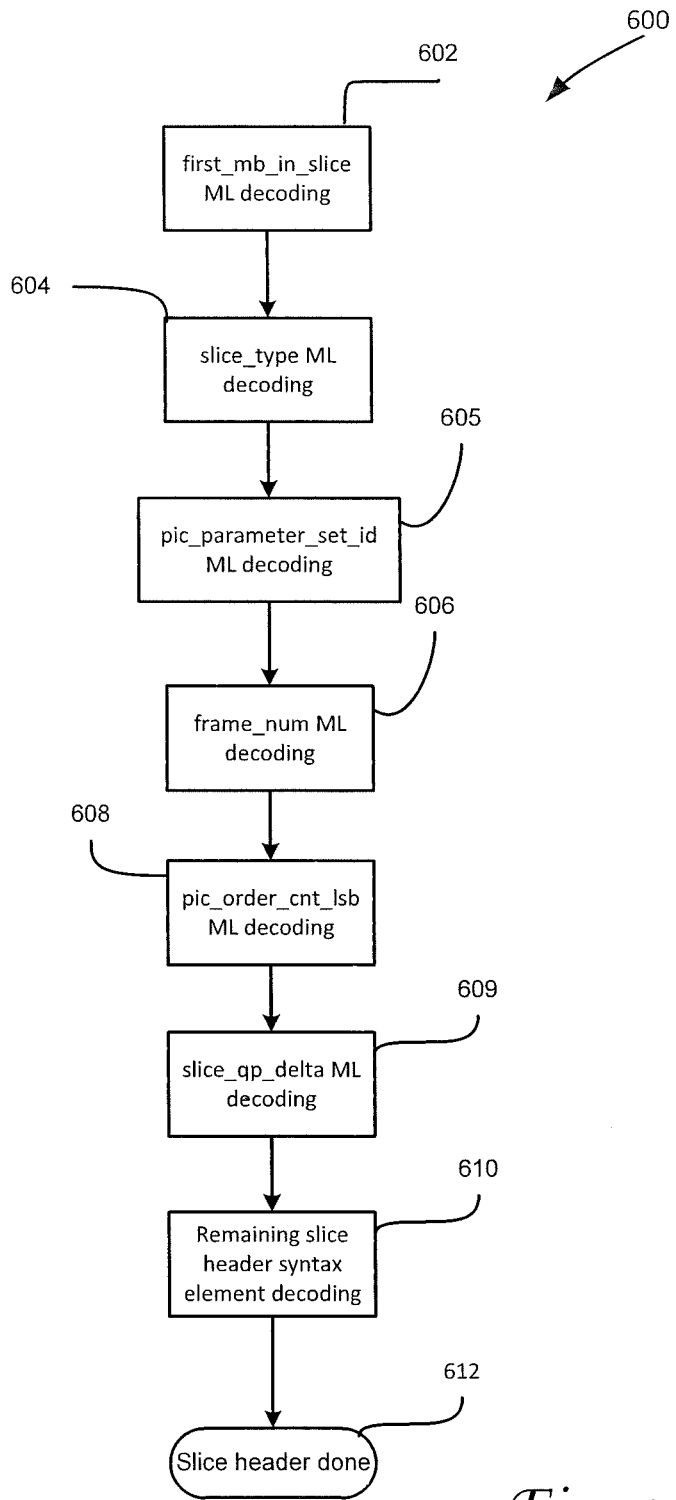
FIG. 6 shows a flowchart of a method for applying maximum likelihood to slice headers in another embodiment of the present invention.

FIG. 6 shows the flowchart illustrating the SE level maximum likelihood decoder of step 360 of FIG. 3 applied to the 6 syntax elements modeled (in sections IV and VI) in another embodiment of the proposed invention. The SE first_mb_in_slice is first decoded in 602. The result is then sent to the SE slice_type ML decoding 604, followed by the SE pic_parameter_set_id ML decoding 605. The result is then sent to the SE frame_num ML decoding 606, followed by the SE pic_order_cnt_lsb ML decoding 608, and finally to the SE slice_qp_delta ML decoding 609. Once the fields have been corrected, the remaining SEs in the slice header are decoded in step 610.

Note that bitstream segments containing SEs for which probabilities have not been established may be sent to a robust decoder, or to a video syntax validator to check if the bitstream segment is valid (decodable without error), without reconstructing the macroblocks.

Figure 5:
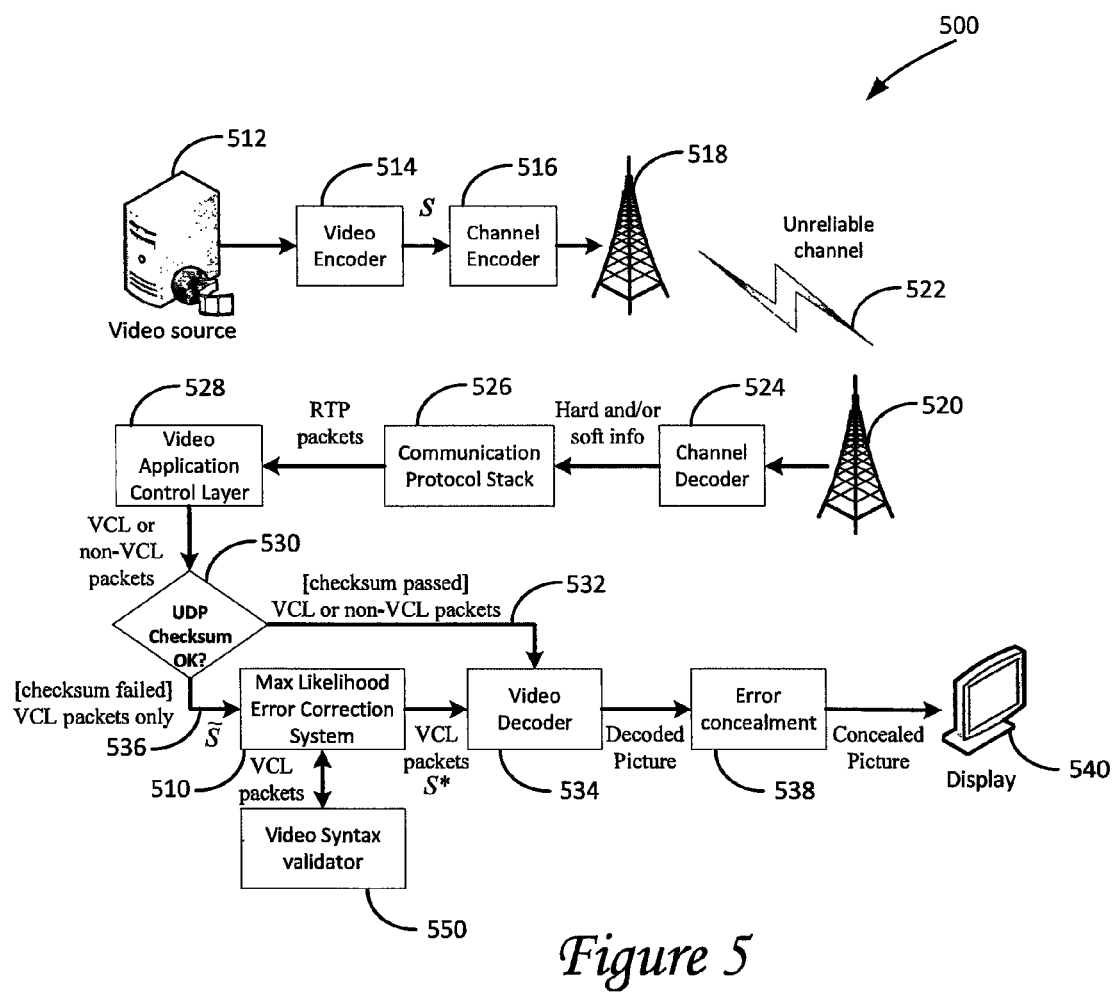
FIG. 5 illustrates schematic representation of a communication network, comprising a maximum likelihood error correction system and a video syntax validator in accordance with an alternative embodiment of the present invention.

FIG. 5 shows a communication system 500 comprising a Maximum Likelihood Error Correction System 510 in accordance with an embodiment of the present invention. The communication system 500 is similar to the communication system 1 presented in FIG. 1, except for the Video Error Correction System 510 sending VCL packets to a video syntax validator 550 instead of a video decoder 534, to determine if the video stream is syntactically valid. Similar elements in FIGS. 1 and 5 have been labeled with similar reference numerals, incremented by 500 in FIG. 5. The video syntax validator 550 receives the maximum likelihood slice candidate S* and interprets the content as described by the video coding standard (and in one aspect, the desired profile and level). It returns the maximum likelihood slice candidate if it conforms to the syntax described by the video coding standard. It raises an error if the maximum likelihood slice candidate does not conform to the syntax described by the video coding standard (and possibly the desired profile and level), preventing S* to be sent to the video decoder. If the slice is not valid, another maximum likelihood slice candidate can be considered, and the process repeated until a valid slice is found.

Similar to FIG. 1 described above, the system for video error correction of the embodiments of the invention, including modules 510 and 550 of FIG. 5, comprises a general purpose or specialized computer having a CPU and a computer readable storage medium, for example, memory, DVD, CD-ROM, floppy disk, flash memory, magnetic tape or other storage medium, having computer readable instructions stored thereon for execution by the CPU. Alternatively, modules 510 and 550 of FIG. 5 can be implemented in firmware, or combination of firmware and/or a specialized computer having a computer readable storage medium.

Since the number of paths to consider will grow exponentially and become prohibitively complex to manage, in yet another embodiment for slice level maximum likelihood decoding, we consider a limited number of candidates which depends on the depth in the trellis and/or the SE we are correcting. One special case is when the number of candidates kept for all SEs of the process is M until the last step where the most likely path is selected.

In that case, we start by retaining the M most likely values of the first SE in the first MB of a slice (with M>1). For each of these M most likely values, we consider the M most likely values of the second SE in the first MB of the slice. Among these candidates, only the M most likely values of the combination of the first two SEs are retained. This process of expanding candidates for each new SE and pruning the M most likely combination of values continues for the whole slice (i.e. for each depth value of the trellis). When we pass through segments of the bitstream where we do not have probability models, such as residual information, we use the same approach as described above, where we attempt to decode the segment and the candidates for which the decoder managed to decode these segments are retained while the others are eliminated. The M likeliest candidates for the bitstream segments should normally be selected from those with the smallest Hamming distances (or the candidate bitstream segments generated by keeping the most reliable bits intact in the case that soft information is available). The process ends when the whole slice has been processed or when no candidate survives after decoding segments where we do not have probability models. It is worth noting that the system proposed here retaining the M most likely candidates is a generalization of the proposed SE level maximum likelihood decoding where a single candidate is retained at each SE.

In this embodiment for the slice level maximum likelihood decoding, it is possible that there is no surviving path, since we eliminate candidate paths to limit the size of the solution space. In that case, we can consider keeping all MBs up until the one where the path ended (contained the syntax error). All MBs, including the MB where an error occurred, following the last kept MB are discarded, and error concealment is applied to these MBs. It is also possible to stop the progression of a path when the edge values leading to a SE, or a bitstream segment, are below a threshold based on that SE, or bitstream segment (i.e. a threshold for first_mb_in_slice, and a different one for slice_type, etc.). In that case, all MBs, including the MB where the edge value was below the threshold, following the last kept MB are discarded, and error concealment is applied to these MBs.

Various other modifications/variations to the embodiments described can be made based on the proposed maximum likelihood approach. For instance, the number of candidates retained could vary per SE and change depending on which SE we are decoding in the slice or how far we are in the decoding process of the slice (e.g. how many MBs have been decoded so far). For example, more candidates could be retained for certain syntax elements that can contain a high number of values such as motion vectors where it could be beneficial to keep more candidates.

Another embodiment could use an iterative approach. The first iteration would solve the problem using the $M=M_1$ likeliest candidates approach, as described above. The next iteration would repeat the process with a larger solution space (using $M_i > M_{i-1}$ for the $i^{th}$ iteration). However, using the likelihood obtained in the previous iteration, candidate SEs and candidate bitstream segments leading to less likely paths would be eliminated, simplifying greatly the computational complexity. This process could be repeated for a fixed number of iterations, or a variable number of iterations until a stopping criterion is met (i.e. when the optimal solution between two iterations does not change, or when the likelihood between two optimal solutions is smaller than a threshold, etc.).

Methods and systems presented in this patent application can be applied to other video standards such as H.263, MPEG-4 part 2, and HEVC. Also, the methods can be applied to other SEs such as motion vector information. In addition, instead of retaining only the most likely SE in each step of the breadth first approach, we can keep the M most likely SEs when decoding each SE. Finally, the likelihood equations can be extended to take into account the likelihood of the reconstructed picture in the pixel domain. For instance, the first_mb_in_slice SE likelihood can take into account the decoded slice connects to the correctly received MBs in the pixel domain (using an approach similar to Trudeau [as discussed in: L. Trudeau, S. Coulombe and S. Pigeon. "Pixel domain referenceless visual degradation detection and error concealment for mobile video," 18th IEEE International Conference on Image Processing, p. 2229-2232, September 2011]). A way to do this would be to select the N most likely values of first_mb_in_slice, and select the one for which the decoded slice connects the best to the correctly received MBs in the pixel domain.

In accordance with the aspects of the invention, the video error correction system 1, 500, 700 in combination with the max likelihood error correction system 10, 510 provides maximum likelihood method and system for performing video error correction, both at the slice-level and at the SE-level. According to the method of the embodiment of the invention at the SE-level using only four H.264 slice header SEs performed better than a state-of-the-art error concealment method. Not only were the PSNR results better, but they were obtained using significantly fewer computations.

FIG. 7 illustrates a schematic diagram of a communication network 1 comprising a Maximum Likelihood Error Correction System 10 of the embodiments of the present invention when soft information is used. The components of FIG. 7 are similar to FIG. 1. In the embodiment of FIG. 7, soft information is specifically propagated from the Communication Protocol Stack 26 to the Video Application Layer 28; and from the Video Application Layer 28 to the Video Error Correction System 10 (also called Max Likelihood Error Correction System).

Referring to FIGS. 8-11, the maximum likelihood error correction system 10 shown as systems 800, 900, 1000, 1100 in accordance with alternate embodiments of the present invention, includes a general purpose or specialized computer having a CPU and a computer readable medium, e.g., memory, DVD, CD-ROM, floppy, magnetic tape or other storage medium, having computer readable instructions stored thereon, which, when executed by the CPU, form modules of the system 800, 900, 1000, 1100 as described in detail below. Alternatively, the system 800, 900, 1000, 1100 can include specialized dedicated hardware or a combination of firmware and a specialized computer having a computer readable storage medium having computer readable instructions stored thereon for execution by the CPU for forming modules of the system 300 as described below. Modules of the system 800, 900, 1000, 1100, namely exemplary modules 810, 820, 830, 840, 910, 920, 930, 940, 950, 1020, and 1120, include a firmware or, alternatively, computer readable instructions stored in a computer readable storage medium for execution by a processor (e.g. the computing device can include the video decoder 34 processor or a separate device such as a combination the channel decoder with a video decoder).

Figure 8:
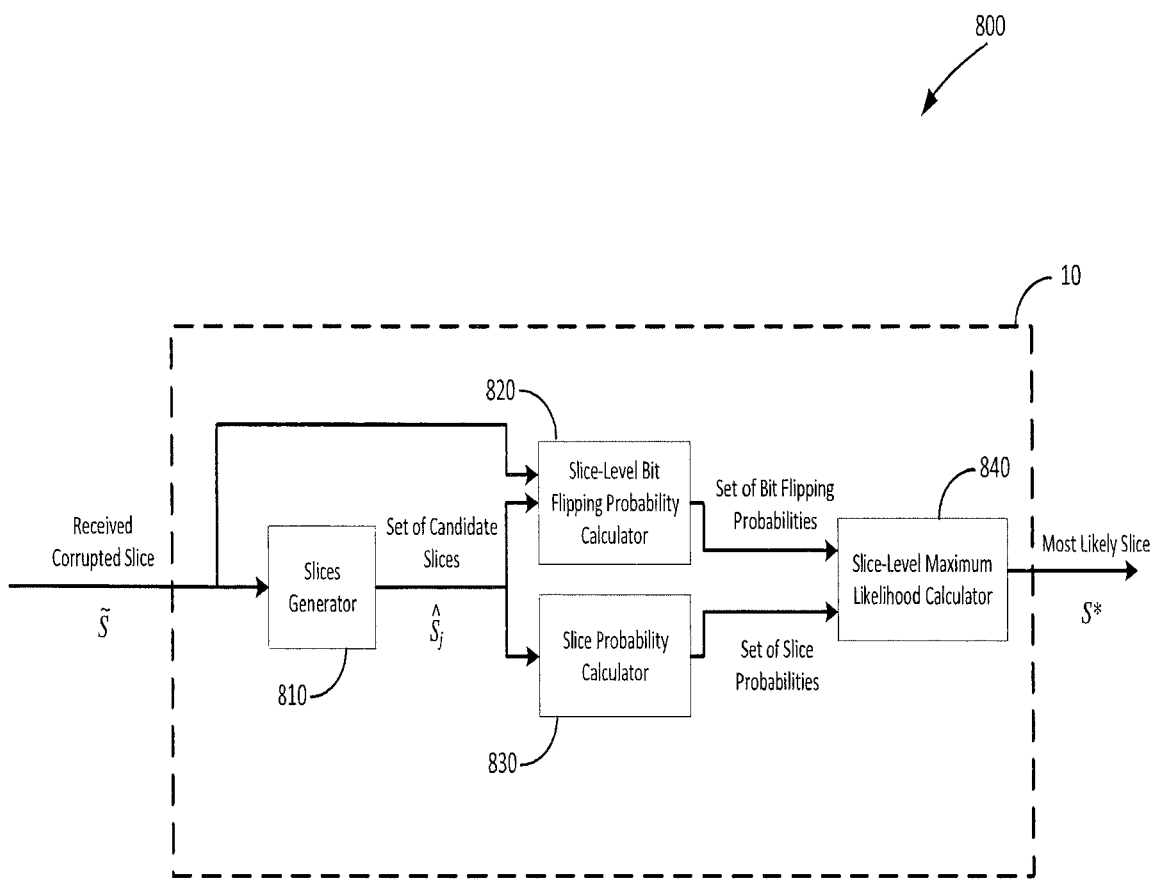
FIG. 8 is a schematic diagram illustrating an exemplary architecture of the maximum likelihood error correction system 10 of FIG. 1 and exemplary interaction of the components in accordance with slice-level maximum likelihood decoding using hard information in accordance with an embodiment of the present invention.
Figure 9:
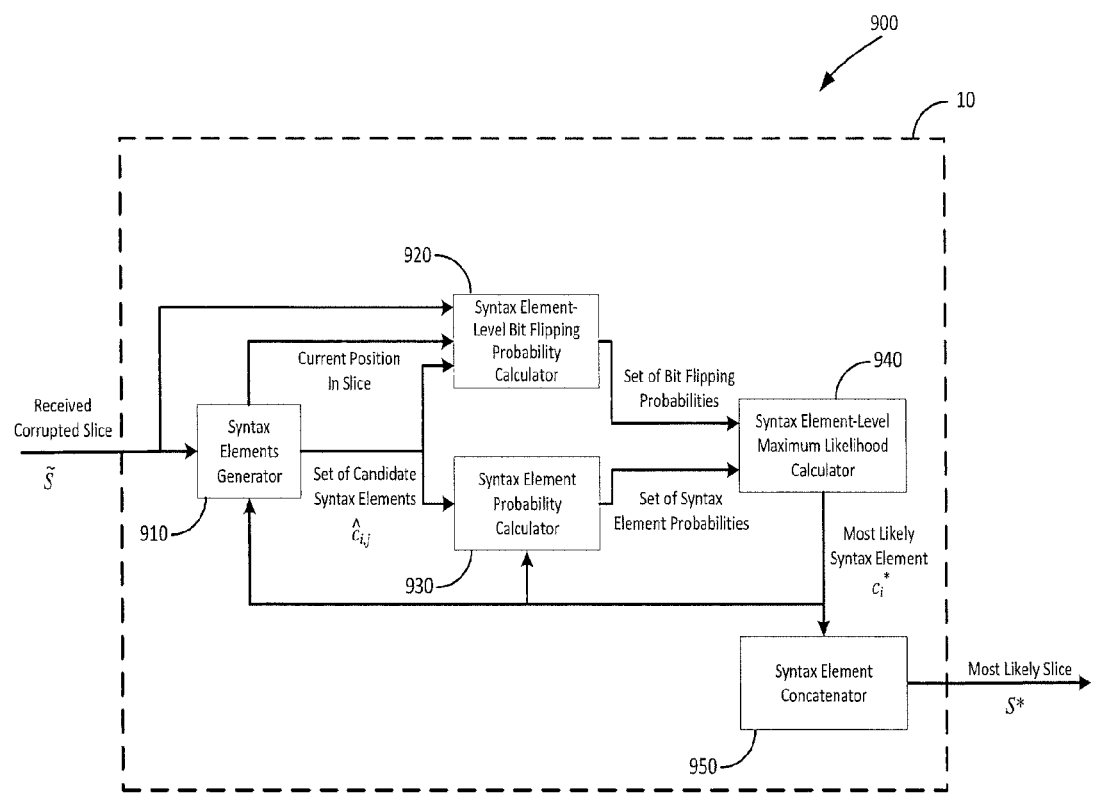
FIG. 9 is a schematic diagram illustrating an exemplary architecture of the maximum likelihood error correction system 10 of FIG. 1 and exemplary interaction of the components in accordance with syntax element-level maximum likelihood decoding embodiment of the invention using hard information.
Figure 10:
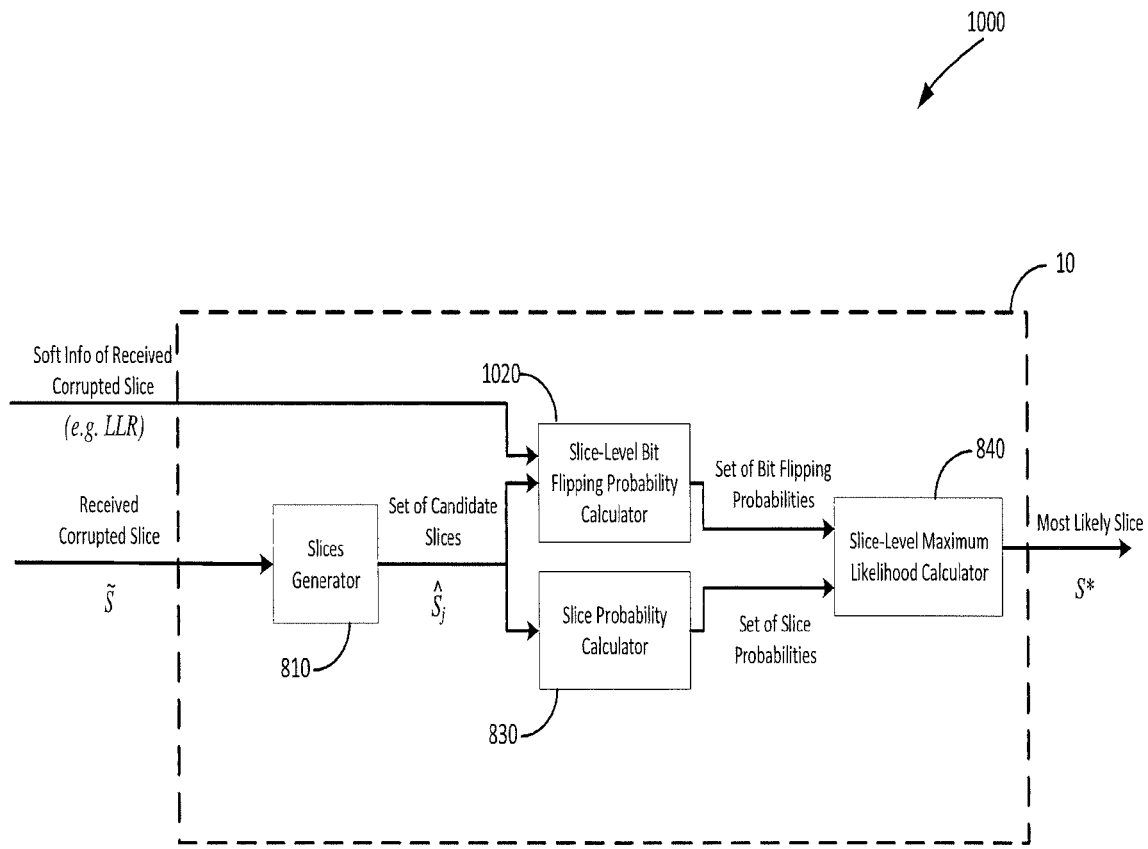
FIG. 10 is a schematic diagram illustrating an exemplary architecture of the maximum likelihood error correction system of FIG. 7 and exemplary interaction of the components in accordance with slice-level maximum likelihood decoding embodiment of the invention using soft information.
Figure 11:
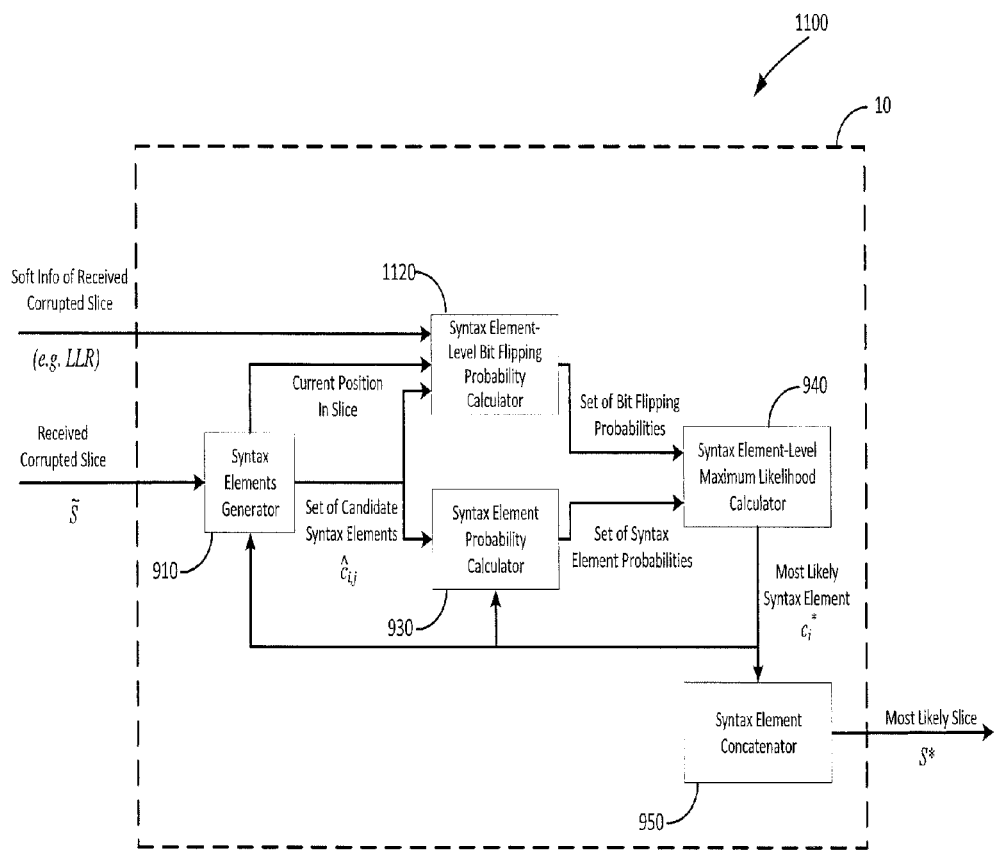
FIG. 11 is a schematic diagram illustrating an exemplary architecture of the maximum likelihood error correction system of FIG. 7 and exemplary interaction of the components in accordance with syntax element-level maximum likelihood decoding embodiment of the invention using soft information.

FIGS. 8 and 9 are associated with FIG. 1 and are related to the embodiment where hard information is used, while FIGS. 10 and 11 are associated with FIG. 7 and are related to the embodiment where soft information is used.

FIG. 8 illustrates a schematic of functional components of the Max Likelihood Error Correction System 10 of FIG. 1 in accordance with the slice-level maximum likelihood decoding embodiment of this invention using hard information. The Max Likelihood Error Correction System 10 comprises a Slices Generator 810, a Slice-Level Bit Flipping Probability Calculator 820, a Slice Probability Calculator 830 and a Slice-Level Maximum Likelihood Calculator 840. The received corrupted slice S (e.g. due to transmission errors or other errors in communicating the video packet) is provided as input of the Max Likelihood Error Correction System 10 of FIG. 1. It is fed to both the Slices Generator 810 and the Slice-Level Bit Flipping Probability Calculator 820. The Slices Generator 810 extracts the length of the received corrupted slice $\tilde{S}$, denoted $L_B(\tilde{S})$, and generates the set of all hypothetical syntactically valid slices of length $L_B(\tilde{S})$ that could have been sent, which are denoted $\hat{S}_j$ (for various values of j), and referred to as the set of candidate slices (also referred to as candidate bitstreams herein). This set of candidate slices is sent to both the Slice-Level Bit Flipping Probability Calculator 820 and the Slice Probability Calculator 830. The Slice-Level Bit Flipping Probability Calculator 820 takes as input the received corrupted slice $\tilde{S}$, and the set of candidate slices (i.e. the set of all $\hat{S}_j$) and computes the bit flipping likelihood $P(\tilde{S}|\hat{S}_j)$ as described in equation (3) for each candidate slice and makes them available at its output as the set of bit flipping probabilities. This likelihood is also called the bit flipping probability and is inversely proportional to the cost of flipping bits between the received corrupted slice $\tilde{S}$, and each candidate slice $\hat{S}_j$. The set of candidate slices is also input to the Slice Probability Calculator 830 where the probability of each candidate slice is computed based on the decoder context (i.e. all relevant previously decoded information, such as previous slices) and makes them available at its output as the set of slice probabilities. Both the set of bit flipping probabilities from the Slice-Level Bit Flipping Probability Calculator 820 and the set of slice probabilities from the Slice Probability Calculator 830 are input to the Slice-Level Maximum Likelihood Calculator 840 where the likelihood of each candidate slice is computed using both the set of bit flipping probabilities and the set of slice probabilities, and where the maximum likelihood among them is identified and made available at its output as the most likely slice S*. This output is also the output of the Max Likelihood Error Correction System 10.

In the preferred embodiment of this invention, the likelihood is discussed as a probability. In particular, it is established, for a candidate slice, as the product of the probability of flipping bits and the slice probability (e.g. or other combination thereof). However, other methods that establish the likelihood of a slice, based on how likely it is compared to other slices by taking into account the syntax elements they contain, counterbalanced by how different it is from the received corrupted slice can be envisaged within the scope of the invention.

FIG. 9 illustrates functional components of the Max Likelihood Error Correction System 10 of FIG. 1 in accordance with the syntax element-level maximum likelihood decoding embodiment of this invention using hard information. The Max Likelihood Error Correction System 10 includes a Syntax Element Generator 910, a Syntax Element-Level Bit Flipping Probability Calculator 920, a Syntax Element Probability Calculator 930, a Syntax Element-Level Maximum Likelihood Calculator 940, and a Syntax Element Concatenator 950. The received corrupted slice S is the input of the Max Likelihood Error Correction System 10. It is fed to both the Syntax Element Generator 910 and the Syntax Element-Level Bit Flipping Probability Calculator 920. The Syntax Element Generator 910, based on the past most likely syntax elements (obtained from the Syntax Element-Level Maximum Likelihood Calculator 940) and the current index i of the syntax element being corrected, generates a current position in the slice (bit position) and a set of all syntactically valid syntax elements that could have been sent, which are denoted $\hat{c}_{i,j}$, and is referred to herein as the set of candidate syntax elements. This set of candidate syntax elements is sent to both the Syntax Element-Level Bit Flipping Probability Calculator 920 and the Syntax Element Probability Calculator 930.

The Syntax Element-Level Bit Flipping Probability Calculator 920 takes as input the received corrupted slice $\tilde{S}$, and the current position in slice and the set of candidate syntax elements (i.e. the set of all $\hat{c}_{i,j}$) generated by the Syntax Element Generator 910. The Syntax Element-Level Bit Flipping Probability Calculator 920 computes the bit flipping likelihood $P(\tilde{S}|\hat{c}_{i,j})$ as described in equation (8) for each candidate slice and makes them available at its output as the set of bit flipping probabilities. Of course, the current position in slice is taken into account to compare the right bits of slice $\tilde{S}$ with $\hat{c}_{i,j}$. This likelihood is also called the bit flipping probability and is inversely proportional to the cost of flipping bits between the right portion of the received corrupted slice $\tilde{S}$, and each candidate syntax element $\hat{c}_{i,j}$. The set of candidate syntax elements is also input to the Syntax Element Probability Calculator 930 where the probability of each candidate syntax element is computed based on the decoder context (i.e. all relevant previously decoded information, including the past most likely syntax elements $c^*_k$, k<i obtained from the Syntax Element-Level Maximum Likelihood Calculator 940) and makes them available at its output as the set of syntax elements probabilities. Both the set of bit flipping probabilities from the Syntax Element-Level Bit Flipping Probability Calculator 920 and the set of syntax element probabilities from the Syntax Element Probability Calculator 930 are input to the Syntax Element-Level Maximum Likelihood Calculator 940 where the likelihood of each candidate syntax element is computed using both the set of bit flipping probabilities and the set of syntax element probabilities, and where the maximum likelihood among them is identified and made available at its output as the most likely syntax element $c^*_i$. The most likely syntax element $c^*_i$ is then sent to the Syntax Element Generator 910 and the Syntax Element Probability Calculator 930. This output is also sent to the Syntax Element Concatenator 950 where the most likely syntax elements $c^*_i$ are concatenated in the order of their decoding to form the most likely slice S*. This output is also the output of the Max Likelihood Error Correction System 10.

Note that in the preferred embodiment of this invention, the likelihood is established as a probability. In particular, it is established, for a candidate syntax element, as the product of the probability of flipping bits and the syntax element probability. However, other methods that establish the likelihood of a syntax element, based on how likely it is compared to other syntax elements counterbalanced by how different it is from the received corrupted syntax element can be developed.

FIG. 10 illustrates functional components of the Max Likelihood Error Correction System 10 of FIG. 7 in accordance with the slice-level maximum likelihood decoding embodiment of this invention using soft information. The Max Likelihood Error Correction System 10 includes a Slices Generator 810, a Slice-Level Bit Flipping Probability Calculator 1020, a Slice Probability Calculator 830 and a Slice-Level Maximum Likelihood Calculator 840. The received corrupted slice $\tilde{S}$ and the soft information (e.g. LLRs) are the inputs of the Max Likelihood Error Correction System 10. The received corrupted slice $\tilde{S}$ is fed to the Slices Generator 810 while the soft information is fed to the Slice-Level Bit Flipping Probability Calculator 1020. The Slices Generator 810 extracts the length of the received corrupted slice $\tilde{S}$, denoted $L_B(\tilde{S})$, and generates the set of all hypothetical) syntactically valid slices of length $L_B(\tilde{S})$ that could have been sent, which are denoted $\hat{S}_j$ (for various values of j), and is referred to herein as the set of candidate slices. This set of candidate slices is sent to both the Slice-Level Bit Flipping Probability Calculator 1020 and the Slice Probability Calculator 830. The Slice-Level Bit Flipping Probability Calculator 1020 takes as input the soft information and the set of candidate slices (i.e. the set of all $\hat{S}_j$) and computes the bit flipping likelihood $P(\tilde{S}|\hat{S}_j)$ as described in equation (6e) (which use (6f) and (6g) for LLRs) for each candidate slice and makes them available at its output as the set of bit flipping probabilities. The Slice-Level Bit Flipping Probability Calculator 1020 is similar to the Slice-Level Bit Flipping Probability Calculator 820 except that the first computes the probability based on soft information instead of hard information (they could be implemented in the same module with different behavior based on the type of input information). The set of candidate slices is also input to the Slice Probability Calculator 830 where the probability of each candidate slice is computed based on the decoder context (i.e. all relevant previously decoded information, such as previous slices) and makes them available at its output as the set of slice probabilities. Both the set of bit flipping probabilities from the Slice-Level Bit Flipping Probability Calculator 1020 and the set of slice probabilities from the Slice Probability Calculator 830 are input to the Slice-Level Maximum Likelihood Calculator 840 where the likelihood of each candidate slice is computed using both the set of bit flipping probabilities and the set of slice probabilities, and where the maximum likelihood among them is identified and made available at its output as the most likely slice S*. This output is also the output of the Max Likelihood Error Correction System 10.

FIG. 11 illustrates functional components of the Max Likelihood Error Correction System 10 of FIG. 7 in accordance with the syntax element-level maximum likelihood decoding embodiment of this invention using soft information. The Max Likelihood Error Correction System 10 includes a Syntax Element Generator 910, a Syntax Element-Level Bit Flipping Probability Calculator 1120, a Syntax Element Probability Calculator 930, a Syntax Element-Level Maximum Likelihood Calculator 940, and a Syntax Element Concatenator 950. The received corrupted slice $\tilde{S}$ and the soft information (e.g. LLRs) are the inputs of the Max Likelihood Error Correction System 10. The received corrupted slice $\tilde{S}$ is fed to the Syntax Element Generator 910 while the soft information is fed to the Syntax Element-Level Bit Flipping Probability Calculator 1120. The Syntax Element Generator 910, based on the past most likely syntax elements (obtained from the Syntax Element-Level Maximum Likelihood Calculator 940) and the current index i of the syntax element being corrected, generates a current position in the slice (bit position) and a set of all syntactically valid syntax elements that could have been sent, which are denoted $\hat{c}_{i,j}$, and is referred to herein as the candidate syntax elements. This set of candidate syntax elements is sent to both the Syntax Element-Level Bit Flipping Probability Calculator 1120 and the Syntax Element Probability Calculator 930. The Syntax Element-Level Bit Flipping Probability Calculator 1120 takes as input the soft information and the current position in slice and the set of candidate syntax elements (i.e. the set of all $\hat{c}_{i,j}$) generated by the Syntax Element Generator 910.

The Syntax Element-Level Bit Flipping Probability Calculator 1120 computes the bit flipping likelihood $P(\tilde{S}|\hat{c}_{i,j})$ as described in equation (11b) for each candidate slice and makes them available at its output as the set of bit flipping probabilities. Of course, the current position in slice is taken into account to compare the right bits of slice $\tilde{S}$ with $\hat{c}_{i,j}$. The Slice-Level Bit Flipping Probability Calculator 1120 is similar to the Slice-Level Bit Flipping Probability Calculator 920 except that the first computes the probability based on soft information instead of hard information (they could be implemented in the same module with different behavior based on the type of input information). The set of candidate syntax elements is also input to the Syntax Element Probability Calculator 930 where the probability of each candidate syntax element is computed based on the decoder context (i.e. all relevant previously decoded information, including the past most likely syntax elements $c^*_k$, k<i obtained from the Syntax Element-Level Maximum Likelihood Calculator 940) and makes them available at its output as the set of syntax elements probabilities. Both the set of bit flipping probabilities from the Syntax Element-Level Bit Flipping Probability Calculator 1120 and the set of syntax element probabilities from the Syntax Element Probability Calculator 930 are input to the Syntax Element-Level Maximum Likelihood Calculator 940 where the likelihood of each candidate syntax element is computed using both the set of bit flipping probabilities and the set of syntax element probabilities, and where the maximum likelihood among them is identified and made available at its output as the most likely syntax element $c^*_i$. The most likely syntax element $c^*_i$ is then sent to the Syntax Element Generator 910 and the Syntax Element Probability Calculator 930. This output is also sent to the Syntax Element Concatenator 950 where the most likely syntax elements $c^*_i$ are concatenated in the order of their decoding to form the most likely slice S*. This output is also the output of the Max Likelihood Error Correction System 10.

In reference to FIGS. 1, 5, 7, 8, 9, 10, and 11, the candidate slice or syntax element likelihood can be based on for example, at least one of: fixed statistical models, previously decoded video information and previously selected most likely candidates and the decoded information they provide (i.e. corrected video information as provided for example by video decoder 34, 534). When previously decoded video information (corrected as well as non corrected) is used, such information in sent from the Video Decoder 34 of FIGS. 1 and 7 to the Maximum Likelihood Error Correction System 10. Similarly, when previously video information is used, such information in sent from the Video Decoder 534 of FIG. 5 to the Maximum Likelihood Error Correction System 510. Within the Maximum Likelihood Error Correction System 10, the information arrives at the Slice Probability Calculator 830 of FIGS. 8 and 10 in the case of a slice-level correction approach. Within the Maximum Likelihood Error Correction System 10, the information arrives at the Syntax Element Probability Calculator 930 of FIGS. 9 and 11 in the case of a syntax element-level correction approach. In these modules, in one aspect, the decoded video information is used to determine the candidate slice or syntax element likelihood.

Although the embodiments of the invention have been described in detail, it will be apparent to one skilled in the art that variations and modifications to the embodiments may be made within the scope of the following claims.

What is claimed is:

1. A computer-implemented method for video error correction of a corrupted video packet segment received at a channel decoder, at least a portion of the segment containing bit errors, the method comprising:
   generating a plurality of candidate bitstreams for said portion based on the received corrupted video packet segment;
   determining a candidate likelihood for each candidate bitstream representing a likelihood of occurrence of the candidate bitstream in comparison with at least one other candidate bitstream;
   determining a bit flipping likelihood associated with inverting bits within said portion to compensate for the errors, the bit flipping likelihood in dependence upon a likelihood of error for each bit within said portion;
   selecting a maximum likelihood candidate having the likeliest syntactically valid sequence of bits from the plurality of candidates, the selected candidate obtained by a combination of the candidate likelihood and the bit flipping likelihood for each of the plurality of candidate bitstreams wherein the selected candidate obtains a highest likelihood for the combination among the generated plurality of candidate bitstreams; and
   correcting errors in the portion based on the selected candidate, the correction to compensate for transmission errors for subsequently providing to a video decoder.

2. The method of claim 1, wherein the candidate likelihood is further in dependence upon a history of at least one of: previously decoded video packet segments by the video decoder and previously selected most likely candidates.

3. The method of claim 2, wherein the combination is calculated by a product of the candidate likelihood and the bit flipping likelihood and the selected candidate obtains a highest value for the product.

4. The method of claim 3, wherein subsequent to correcting the errors, the video packet is decoded and if one of the portions of the segment is missing, the method further comprises concealment of the missing portion.

5. The method of claim 3 further comprising validating at a video syntax validator, whether the estimated likeliest valid sequence of bits is valid and decodable without error prior to decoding.

6. The method of claim 2, wherein the portion for generating the plurality of candidate bitstreams is one of a syntax element and a slice element of the corrupted video packet segment for creating a corresponding one of: a plurality of candidate syntax elements and a plurality of candidate slices.

7. The method of claim 6, wherein generating the plurality of candidate bitstreams further comprises determining a length of said portion of the corrupted video packet segment and generating said plurality of candidate bitstreams each having the length of said portion.

8. The method of claim 6, wherein when said portion comprises a syntax element being a subset of the slice, the generated maximum likelihood candidate provides a corresponding maximum likelihood syntax element for each subset of the slice and the method further comprises concatenating the maximum likelihood syntax elements corresponding to each subset of the slice to generate a corresponding maximum likelihood slice.

9. The method of claim 2, wherein the likelihood of error for each bit within said portion comprises a bit error rate associated with an unreliable channel, the channel bit error rate being constant for the portion.

10. The method of claim 9 further comprising, receiving soft information from the channel decoder providing a reliability measure of each received bit within the portion of the corrupted video packet segment and utilizing the soft information in combination with the channel bit error rate for determining the bit flipping likelihood and for subsequent selection of the maximum likelihood candidate.

11. The method of claim 10 wherein the soft information comprises a log likelihood ratio for determining the likelihood of the value of each received bit within the portion of the corrupted video packet segment to be one of: 0 or 1.

12. The method of claim 9, wherein the bit error rate is further associated with previously received video packet segments.

13. The method of claim 2, wherein the bit errors correspond to transmission errors caused by an unreliable channel between the channel decoder and a channel encoder wherein at least one of lost and altered bits due to channel noise associated with the channel.

14. The method of claim 2, wherein the bit flipping likelihood is inversely proportional to a cost of inverting the bits between the portion of the corrupted video packet segment and each of said plurality of candidate bitstreams.

15. A computer-implemented method for video error correction of a corrupted video packet segment containing bit errors received at a channel decoder, the video packet segment comprising at least two portions, the method comprising:
  generating a plurality of candidate bitstreams for each said portion based on the received corrupted video packet segment, at least one bit error contained in one of said portions;
  determining a candidate likelihood for each candidate bitstream representing a likelihood of occurrence of the candidate bitstream in comparison with at least one other candidate bitstream;
  determining a bit flipping likelihood associated with inverting bits for each said portion to compensate for the errors, the bit flipping likelihood in dependence upon a likelihood of error for each bit within each said portion;
  generating a trellis of candidates for said at least two portions, the trellis comprising a plurality of links, each link representing each of the candidates for each of said at least two portions and connected therewith; and,
  selecting a maximum likelihood path among said links in dependence upon a highest likelihood for a combination of the candidate likelihood and the bit flipping likelihood for said portions taken together.

16. A computing device for receiving a video packet segment providing video error correction, the computing device comprising:
  a processor;
  a memory coupled to the processor, the memory comprising computer readable instructions which, when executed in the processor configure the processor to:
  determine an occurrence of bit errors in at least a portion of the segment;
  upon determining the occurrence, the processor is further configured to:
  generate a plurality of candidate bitstreams for said portion based on the received corrupted video packet segment;
  determine a candidate likelihood for each candidate bitstream representing a likelihood of occurrence of the candidate bitstream in comparison with at least one other candidate bitstream;
  determine a bit flipping likelihood associated with inverting bits within said portion to compensate for the errors, the bit flipping likelihood in dependence upon a likelihood of error for each bit within said portion;
  select a maximum likelihood candidate having the likeliest syntactically valid sequence of bits from the plurality of candidates, the selected candidate obtained by a combination of the candidate likelihood and the bit flipping likelihood for each of the plurality of candidate bitstreams wherein the selected candidate obtains a highest likelihood for the combination among the generated plurality of candidate bitstreams; and
  correct errors in the portion based on the selected candidate, the correction for subsequently being provided to a video decoder coupled to the processor and to the memory configured for presentation at a display of the computing device, the display being coupled to the processor and to the memory.

17. The computing device of claim 16, wherein the candidate likelihood is further in dependence upon a history of at least one of: previously decoded video packet segments by the video decoder and previously selected most likely candidates.

18. The computing device of claim 17, wherein the combination is calculated by a product of the candidate likelihood and the bit flipping likelihood and the selected candidate obtains a highest value for the product.

19. The computing device of claim 17, wherein the portion for generating the plurality of candidate bitstreams is one of a syntax element and a slice element of the corrupted video packet segment for creating a corresponding one of: a plurality of candidate syntax elements and a plurality of candidate slices.

20. The computing device of claim 19, wherein the processor is further configured to validate at a video syntax validator, whether the estimated likeliest valid sequence of bits is valid and decodable without error prior to decoding.

21. The computing device of claim 19, wherein generating the plurality of candidate bitstreams further comprises determining a length of said portion of the corrupted video packet segment and generating said plurality of candidate bitstreams each having the length of said portion.

22. The computing device of claim 17, wherein the likelihood of error for each bit within said portion comprises a bit error rate associated with an unreliable channel, the channel bit error rate being constant for the portion.

23. The computing device of claim 22 wherein the processor is further configured to receive soft information from the channel decoder providing a reliability measure of each received bit within the portion of the corrupted video packet segment and utilize the soft information in combination with the channel bit error rate for determining the bit flipping likelihood and for subsequent selection of the maximum likelihood candidate.

24. The computing device of claim 23 wherein the soft information comprises a log likelihood ratio for determining the likelihood of the value of each received bit within the portion of the corrupted video packet segment to be one of: 0 or 1.

25. The computing device of claim 22, wherein the bit error rate is further associated with previously received video packet segments.

26. The computing device of claim 22, wherein when said portion comprises a syntax element being a subset of the slice, the generated maximum likelihood candidate provides a corresponding maximum likelihood syntax element for each subset of the slice and the method further comprises concatenating the maximum likelihood syntax elements corresponding to each subset of the slice to generate a corresponding maximum likelihood slice.

27. The computing device of claim 17, wherein the bit errors correspond to transmission errors caused by an unreliable channel between the channel decoder and a channel encoder wherein at least one of lost and altered bits due to channel noise associated with the channel.

28. The computing device of claim 17, wherein subsequent to correcting the errors, the processor is configured to decode the video packet segment and if one of the portions of the segment is missing, the processor is further configured to conceal the missing portion.

29. The computing device of claim 17, wherein the bit flipping likelihood is inversely proportional to a cost of inverting the bits between the portion of the corrupted video packet segment and each of said plurality of candidate bitstreams.

30. The computing device of claim 17, wherein the candidate likelihood is further in dependence upon a history of at least one of: previously decoded video packet segments by the video decoder and previously selected most likely candidates.

\* \* \* \* \*